US007522733B2

(12) United States Patent
Kraemer et al.

(10) Patent No.: US 7,522,733 B2
(45) Date of Patent: Apr. 21, 2009

(54) SYSTEMS AND METHODS OF SPATIAL IMAGE ENHANCEMENT OF A SOUND SOURCE

(75) Inventors: Alan Kraemer, Irvine, CA (US); Richard J. Oliver, Capistrano Beach, CA (US)

(73) Assignee: SRS Labs, Inc., Santa Ana, CA (US)

( * ) Notice: Subject to any disclaimer, the term of this patent is extended or adjusted under 35 U.S.C. 154(b) by 724 days.

(21) Appl. No.: 10/734,776

(22) Filed: Dec. 12, 2003

(65) Prior Publication Data

US 2005/0129248 A1 Jun. 16, 2005

(51) Int. Cl.
*H04R 5/00* (2006.01)
*H04B 3/00* (2006.01)

(52) U.S. Cl. .............................................. 381/1; 381/77

(58) Field of Classification Search .................. 381/17, 381/18, 1, 97, 309, 98, 77
See application file for complete search history.

(56) References Cited

U.S. PATENT DOCUMENTS 3,161,727 A 12/1964 Recklinghausen
3,541,266 A 11/1970 Klayman et al.
4,239,937 A 12/1980 Kampman
4,239,939 A 12/1980 Griffis
4,308,424 A 12/1981 Bice, Jr
4,394,535 A 7/1983 Bingham et al.
4,479,235 A 10/1984 Griffis
4,489,432 A 12/1984 Polk
4,496,979 A 1/1985 Yu et al.
4,555,795 A 11/1985 Bedini
4,594,610 A 6/1986 Patel
4,594,730 A 6/1986 Rosen
4,625,326 A 11/1986 Kitzen et al.
4,633,495 A 12/1986 Shotz
4,685,134 A 8/1987 Wine (Continued)

FOREIGN PATENT DOCUMENTS

EP 0097 982 A3 1/1984

(Continued)

OTHER PUBLICATIONS

Schroeder, M.R., "An Artificial Stereophonic Effect Obtained from a Single Audio Signal", Journal of the Audio Engineering Society, vol. 6, No. 2, pp. 74-79, Apr. 1958.

(Continued)

*Primary Examiner*—Ping Lee
(74) *Attorney, Agent, or Firm*—Knobbe Martens Olson & Bear, LLP

(57) ABSTRACT

Reproduction of stereophonic audio information over a single speaker requires summing multiple stereo channels. When signals having approximately equal magnitudes and approximately opposite phases at a frequency are added together, the audio information at the frequency is lost.

To preserve areas of potential cancellation and potential audio information loss, the audio enhancement system adjusts the phase relationship between the stereophonic channels. To avoid the loss of the spatial content of the stereo signal, the audio enhancement system determines the difference information that exists between different stereophonic channels. The audio enhancement system enhances the difference information and mixes the enhanced difference information with the phase adjusted signals to generate an enhanced monophonic output.

18 Claims, 17 Drawing Sheets

U.S. PATENT DOCUMENTS

| | | | | |
|---|---|---|---|---|
| 4,706,287 | A | 11/1987 | Blackmer | |
| 4,748,669 | A | 5/1988 | Klayman | |
| 4,819,269 | A | 4/1989 | Klayman | |
| 4,836,329 | A | 6/1989 | Klayman | |
| 4,841,572 | A | 6/1989 | Klayman | |
| 4,866,774 | A | 9/1989 | Klayman | |
| 4,972,489 | A * | 11/1990 | Oki et al. | 381/97 |
| 5,319,713 | A | 6/1994 | Waller, Jr. et al. | |
| 5,333,201 | A | 7/1994 | Waller, Jr. | |
| 5,459,813 | A | 10/1995 | Klayman | |
| 5,555,306 | A | 9/1996 | Gerzon et al. | |
| 5,638,452 | A | 6/1997 | Waller, Jr. | |
| 5,661,808 | A | 8/1997 | Klayman | |
| 5,771,295 | A | 6/1998 | Waller, Jr. | |
| 5,784,468 | A | 7/1998 | Klayman | |
| 5,850,453 | A | 12/1998 | Klayman et al. | |
| 5,892,830 | A | 4/1999 | Klayman | |
| 5,912,976 | A | 6/1999 | Klayman et al. | |
| 5,970,152 | A | 10/1999 | Klayman | |
| 6,281,749 | B1 | 8/2001 | Klayman et al. | |
| 6,285,767 | B1 | 9/2001 | Klayman | |
| 6,590,983 | B1 | 7/2003 | Kraemer | |
| 6,597,791 | B1 | 7/2003 | Klayman | |

FOREIGN PATENT DOCUMENTS

| | | |
|---|---|---|
| GB | 2 053 624 A | 2/1981 |

OTHER PUBLICATIONS

Kurozumi, K., et al., "A New Sound Image Broadening Control System Using a Correlation Coefficient Variation Method", Electronics and Communications in Japan, vol. 67-A, No. 3, pp. 204-211, Mar. 1984.

Sundberg, J., "The Acoustics of the Singing Voice", The Physics of Music, pp. 16-23, 1978.

Ishihara, M., "A New Analog Signal Processor For A Stereo Enhancement System", IEEE Transactions on Consumer Electronics, vol. 37, No. 4, pp. 806-813, Nov. 1991.

Allison, R., "The Loudspeaker/Living Room System", Audio, pp. 18-22, Nov. 1971.

Vaughan, D., "How We Hear Direction", Audio, pp. 51-55, Dec. 1983.

Stevens, S., et al., "Chapter 5: The Two-Eared Man", Sound and Hearing, pp. 98-106 and 196, 1965.

Eargle, J., "Multichannel Stereo Matrix Systems: An Overview", Journal of the Audio Engineering Society, pp. 552-558, 1971.

Stock, G., "The New Featherweight Headphones" Audio, pp. 30-32, May 1981.

Gilman, S., "Some Factors Affecting the Performance of Airline Entertainment Headsets", Journal of Audio Engineering Society; vol. 31, No. 12, pp. 914-920, Dec. 1983.

Dickey, R., "Outputs of Op-Amp Networks Have Fixed Phase Difference", pp. 129-130.

Sakamato, N., et al., "On the Advanced Stereophonic Reproducing System Ambience Stereo", Audio Engineering Society Preprint No. 1361 (G-3), presented at the 670th Convention, May 2-5, 1978, Los Angeles.

National Radio Systems Committee, "Specification of the Radio Broadcast Data System (RBDS)," United States RBDS Standard, pp. 1-132, Jan. 8, 1993.

Wilson, Kim, "AC-3 Is Here! But Are You Ready To Pay The Price?", Home Theater, pp. 60-65, Jun. 1995.

Audio Cyclopedia, p. 1092, 1979.

Kaufman, Richard J., "Frequency Contouring For Image Enhancement", Audio, pp. 34-49, Feb. 1985.

Philips Components, "Integrated Circuits Data Handbook: Radio, audio and associated systems, Bipolar, MOS, CA 3089 to TDA1510A" Oct. 7, 1987, pp. 103-110.

Kawano, et al., "Development of the Virtual Sound Algorithm", IEEE, p. 1189-1193, Jun. 17, 1998.

Coatzee, et al., "An LSP Based Speech Quality Measure", ICASSP-89, vol. 1, pp. 596-599, May 23-26, 1989.

Lim, "Enhancement and Bandwidth Compression of Noisy Speech", Proceedings of the IEEE, vol. 67, No. 12, pp. 1586-1605, Dec. 1979.

Conway, et al., "Evaluation of a Technique Involving Processing with Feature Extraction to Enhance the Intelligibility of Noise-Corrupted Speech", IECON '90 Conference of IEEE Industrial Electronics Society, vol. 1, pp. 28-33, Nov. 27-30, 1990.

Conway, et al., "Adaptive Postfiltering Applied to Speech in Noise", Midwest Symposium on Circuits and Systems, pp. 101-104, Aug. 14-15, 1989.

Clarkson, et al., "Envelope Expansion Methods for Speech Enhancement", J. Acoust. Soc. Am., vol. 89, No. 3, pp. 1378-1382, Mar. 1991.

Packaging Parade, Bulk Merchandising Display, No. 6, p. 85, May 1948.

* cited by examiner

SYSTEMS AND METHODS OF SPATIAL IMAGE ENHANCEMENT OF A SOUND SOURCE

BACKGROUND OF THE INVENTION

1. Field of the Invention

The invention relates generally to audio enhancement systems, and more particularly, is directed to spatially enhancing audio for reproduction through a speaker.

2. Description of the Related Art

Many technology devices use a single small speaker to reproduce sound. Such devices include, but are not limited to, cellular telephones, personal digital assistants (PDA's), laptop computers, television sets, radios, and various small hand-held devices. Often such devices have poor audio capabilities and because only one speaker is utilized, they are monophonic. Thus, such systems often cannot accurately reproduce stereophonic information.

True stereophonic reproduction is characterized by at least two distinct qualities. The first quality is the directional separation of sound sources to produce the sensation of width. Directional separation is generally described as that which gives the listener the ability to judge the selective location of various sound sources, such as the position of instruments within an orchestra.

The second quality is the sensation of depth and presence that the directional separation creates. Presence is generally described as the feeling that the sounds seem to emerge, not from the reproducing loudspeakers themselves, but from positions in between and somewhat behind the loudspeakers. The term "ambience" is also used to describe this sensation of width, depth, and/or presence.

Attempts to reproduce stereophonic information with monophonic systems have included the approach of adding the stereophonic channels together with the intent of presenting information from all the channels through a single speaker. Unfortunately, merely adding the stereophonic information often results in the loss of information. For example, stereo information in one channel may be out of phase with information existing in another channel. When the two channels are added together, information is lost due to phase cancellation of the information.

Consequently the directional separation and the sensation of depth and presence are lost when different channels of stereophonic information are combined together using existing methods.

SUMMARY OF THE INVENTION

The system and method disclosed herein spatially enhances audio for reproduction through a single speaker. The audio enhancement system enhances the ambient component of the stereo input signals and mixes the enhanced ambient signal with the stereo input signals to produce monophonic audio information.

In one embodiment, the audio enhancement system generates a monophonic output from a pair of input signals. The system combines at least a portion of the first input with at least a portion of the second input to isolate difference information, enhances the difference information to produce enhanced difference information, and combines the enhanced difference information with the first and second inputs to generate an enhanced monophonic output.

In another embodiment, the audio enhancement system enhances the ambient component of the stereo input signals and mixes the enhanced ambient signal with the monophonic component of the input signals to produce monophonic audio information.

In an embodiment, the audio enhancement system generates a monophonic output from a pair of input signals. The system combines at least a portion of the first input with at least a portion of the second input to isolate difference information and combines a portion of the first input with the second input to isolate sum information. The system enhances the difference information to produce enhanced difference information, and combines the enhanced difference information with the sum information to generate an enhanced monophonic input.

In other embodiments, the system does not create the sum and difference information prior to combining the signals. The mixer isolates the sum and difference information, in addition to combining the enhanced information with the sum and difference information. A digital signal processor, for example, can implement an audio enhancement system of this type.

The stereo input signals are typically a left stereo channel input and a right stereo channel input. In addition, the stereo input signals can be synthetically generated from a monophonic input signal.

The enhancer used to enhance the ambient information comprises a filter, a gain, a filter and a gain, a delay, or the like. The characteristics of the enhancer may be dependent on the characteristics of the speaker, which reproduces the spatially enhanced monophonic audio.

In general, different speakers have different characteristics. More specifically, different sized speakers have different speaker coefficients. These differences accordingly require unique enhancer characteristics to enhance the stereo input information that is to be played through the speaker. Depending on the enhancer used, the audio enhancement system may need to adjust the phase relationship and other properties of the signals.

While the enhancer characteristics are dependent upon the speaker, the enhancer characteristics can also indicate if the audio enhancement system requires phase adjustment. The enhancer can be characterized by its magnitude and phase responses. If the magnitude response is approximately 0 dB at the frequency where the phase response is approximately 0°, audio information at that frequency will be lost when the enhanced signal mixes with the stereo input signals. To preserve the potentially canceled audio information, the audio enhancement system adjusts the phase relationship of the audio enhancement signals.

The system enhances the difference information to produce enhanced difference information, and phase adjusts the sum information to produce phase adjusted sum information. The system combines the enhanced difference information with the phase adjusted sum information to generate an enhanced monophonic output signal while audio information that potentially would be canceled is preserved.

The system can adjust the phase of the difference signal, or the system can adjust the phase of both the sum and difference signals. As mentioned previously, the sum and difference information need not be isolated prior to mixing the signals. The system can adjust the phase of one or both of the input signals and produce the sum and difference information in the mixer as intermediate steps.

In one embodiment, the phase adjuster adjusts the sum signal. In another embodiment, the phase adjuster adjusts the difference signal. In a further embodiment, the system phase adjusts both the sum information and the difference information. In yet a further embodiment, the system adjusts the phase response of the left and right channel input signals.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

DETAILED DESCRIPTION OF THE PREFERRED EMBODIMENT

Figure 1A:
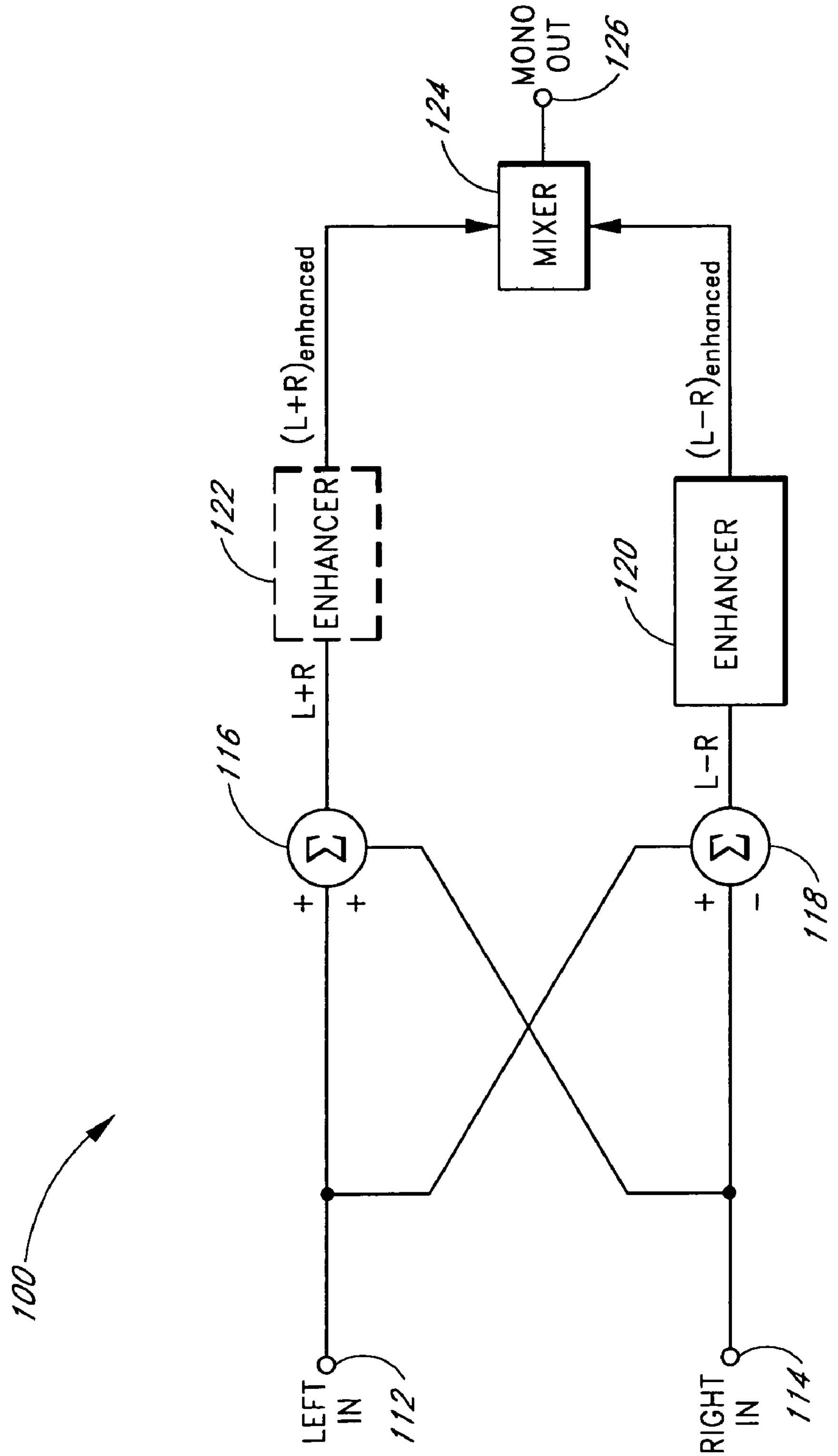
FIG. 1A is a block diagram of an audio enhancement system for generating an enhanced monaural image from a pair of stereo input signals, according to an embodiment of the invention.

An audio enhancement system combines stereophonic input signals to generate a monaural output signal with enhanced spatial characteristics. To avoid the loss of signal information that occurs when the stereo input signals are merely added, in one embodiment the audio enhancement system adjusts the phase of the signals. Phase adjustment is used to modify the frequency response of the system at frequencies where the system responses have approximately equal amplitudes and opposite phases. The adjustment at these frequencies avoids potential cancellation of information and preserves the original audio fidelity.

In one embodiment, the stereophonic information is processed to create an enhanced spatial impression when the information from different channels is combined to create a monophonic output. For example, an embodiment of the invention uses spatial enhancement to enhance the reproduction of stereo sound on a television having a monophonic audio output.

In an embodiment, for example, to enhance the reproduction of stereo sound on a television having a single speaker, the audio enhancement system determines the difference information that exists between different stereophonic channels. An enhancer then enhances the difference information to create an enhanced spatial impression. The enhancer can be a filter, such as a perspective filter, a band-pass filter, a high-pass filter, a low-pass filter, an all-pass filter, a gain, a filter and a gain, a delay, or the like. In an embodiment, the gain of the enhanced difference information is adjusted. In addition, a combiner combines the stereophonic channels to generate a sum signal. A mixer combines the enhanced difference information with the sum signal to generate an enhanced monophonic output. The result is a restoration of detail and the impression that the sound source is much larger when the sound is reproduced.

The sum and difference information need not be created prior to enhancing the signals, but can be created in the mixer. In another embodiment, an enhancer enhances the stereophonic channel inputs. The enhanced stereophonic information is mixed with the original stereophonic information to generate an enhanced monophonic output. In an embodiment, intermediate steps in the mixer generate the sum and difference information. A digital signal processor, for example, can implement the mixer.

In another implementation, the invention phase shifts the signals to preserve audio information that potentially could be lost when the signals combine to create the output. In an embodiment, for example, to enhance the reproduction of stereo sound on a cell phone speaker, the audio enhancement system extracts the difference information from the stereophonic input. An enhancer enhances the difference signal to create an enhanced spatial impression. The enhancer can be a filter, such as a perspective filter, a band-pass filter, a high-pass filter, a low-pass filter, an all-pass filter, or the like, a gain, a filter and a gain, a delay, or the like. In an embodiment, a gain control device adjusts the gain of the enhanced difference information. A combiner then generates the sum or monophonic information from the stereophonic signal and a phase adjuster adjusts the phase of the monophonic information. The phase adjuster can be a filter, such as a perspective filter, a lagging filter, a leading filter, a band-pass filter, a high-pass filter, a low-pass filter, an all-pass filter, or the like. The audio enhancement system combines the phase adjusted monophonic information and the enhanced difference information to produce the monophonic output.

In other embodiments, the phase adjuster adjusts the phase of the difference information. The audio enhancement system combines the monophonic information and the phase adjusted enhanced difference information to produce the monophonic output.

In further embodiments, the phase adjuster adjusts both the sum and the difference information, using, for example, a leading and a lagging filter, or the like. The audio enhancement system combines the phase adjusted monophonic information with the phase adjusted difference information to produce the monophonic output.

In yet other embodiments utilizing a phase adjustment, the sum and difference information need not be created prior to enhancing the signals, but can be created as intermediate steps in the mixer. A digital signal processor, for example, can implement the mixer. The audio enhancement system phase adjusts either stereophonic channel input or both stereophonic channel inputs. In addition, the enhancer enhances the stereophonic channel inputs.

In the embodiment where both input channels are phase adjusted, the audio enhancement system combines the phase adjusted stereophonic signals and the enhanced stereophonic information to produce the monophonic output.

In the embodiment where only one stereophonic input channel is phase adjusted, the audio enhancement system combines the phase adjusted stereophonic signal, the other original stereophonic signal, and the enhanced stereophonic channel information to produce the monophonic output.

In other embodiments, the stereo input signals are synthetically generated from a monaural input. The monophonic input information is processed to create an enhanced spatial impression. One approach delays information in the monaural input signal so that a spatial impression is created when the delayed information is combined with the original monaural signal to create the output.

In an embodiment to create a spatially enhanced monophonic output from a monophonic input signal, the audio enhancement system determines the difference information that exists between the monophonic input and the delayed monophonic input. An enhancer enhances the difference information to create a spatial impression. In addition, a combiner combines the monophonic input and the delayed monophonic input to generate a sum signal. In an embodiment, a gain control device adjusts the gain of the enhanced difference information. A mixer combines the enhanced difference information with the sum signal to generate an enhanced monophonic output. The result is the impression that the sound source is much larger when the sound is reproduced.

As summarized above, one embodiment of the invention comprises an audio enhancement system which generates a single audio output channel from two or more audio input channels, such that portions of the ambience present in the input channels are preserved in the output channel. For convenience and clarity of presentation, the discussion which follows assumes the input channels comprise stereophonic left and right channels and the audio enhancement system provides a single output.

The input, however, need not be limited to two stereo channels and embodiments of the invention can be used in many applications where the ambience of reproduced sound is produced by generating an output channel from a plurality of input channels. Furthermore, embodiments of the invention can be used in applications where the ambience of reproduced sound is produced by generating an output channel from at least one input channel. In addition, the input signals can comprise analog information or digital information, or the like. The output signal can also comprise analog information or digital information, or the like.

For a more detailed understanding of the invention, reference is first made to FIG. 1A. FIG. 1A illustrates an audio enhancement system 100 in accordance with an embodiment of the invention. A first input of a differencing device 118 receives a left input, $L_{IN}$, 112 and a second input of the differencing device 118 receives a right input, $R_{IN}$, 114.

The differencing device 118 produces a difference signal (L−R), which represents the spatial or ambient component of the stereo input signals, $L_{IN}$ and $R_{IN}$. In an embodiment, the differencing device 118 comprises a subtractor. In another embodiment, the differencing device 118 comprises a combiner.

As further illustrated in FIG. 1A, an output of the differencing device 118 provides an input to an enhancer 120.

The enhancer 120 receives the spatial component (L−R) of the signal. The enhancer 120 enhances the spatial characteristics of the signal. In one embodiment, the enhancer 120 broadens and blends a perceived sound stage from the audio input information by selectively enhancing the sound information that provides a sense of spaciousness. The enhancer 120 produces an enhanced difference component $(L-R)_{enhanced}$.

In an embodiment of the invention, the enhancer 120 comprises a perspective filter. In other embodiments of the invention, the enhancer 120 comprises a band-pass filter, an all-pass filter, a high-pass filter, a low-pass filter, or the like. In yet further embodiments of the invention, the enhancer 120 comprises a gain, a filter and a gain in series, a delay, or the like. An output of the enhancer 120 provides a first input to a mixer 124.

As illustrated in FIG. 1A, a first input of a summing device 116 receives the left input, $L_{IN}$, 112 and a second input of the summing device 116 receives the right input, $R_{IN}$, 114.

The summing device 116 produces a sum signal, L+R, which represents the direct or monaural component of the stereo input signals, $L_{IN}$ and $R_{IN}$. In an embodiment, the summing device 116 comprises an adder. In another embodiment, the summing device 116 comprises a combiner. An output of the summing device 116 provides an input to an enhancer 122.

The enhancer 122 phase adjusts the sum signal relative to the difference signal to preserve audio information. This audio information could potentially be canceled and lost when the mixer 124 combines the signals. The enhancer 122 produces a phase adjusted sum component $(L+R)_{enhanced}$.

In an embodiment of the invention, the enhancer 122 comprises an all-pass filter. In other embodiments of the invention, the enhancer 122 comprises a band-pass filter, a high-pass filter, a low-pass filter, a leading filter, a lagging filter, or the like.

An output of the enhancer 122 provides a second input to the mixer 124 and, as described above, the output of the enhancer 120 provides the first input to the mixer 124. An output of the mixer 124 is an enhanced monophonic output 126.

The mixer 124 combines the enhanced difference component $(L-R)_{enhanced}$ with the phase adjusted direct component $(L+R)_{enhanced}$ to produce the monaural output 126 with enhanced spatial impression.

Depending on the enhancer 120 used in the audio enhancement system 100, as discussed previously, the system may need or may not need phase adjustment. In embodiments of the audio enhancement system 100 that do not need phase adjustment, the enhancer 122 is removed. The output of the summing device 116 provides the second input to the mixer 124. The mixer 124 combines the enhanced difference component $(L-R)_{enhanced}$ with the direct component (L+R) to produce the monaural output 126 with enhanced spatial impression.

Figure 1B:
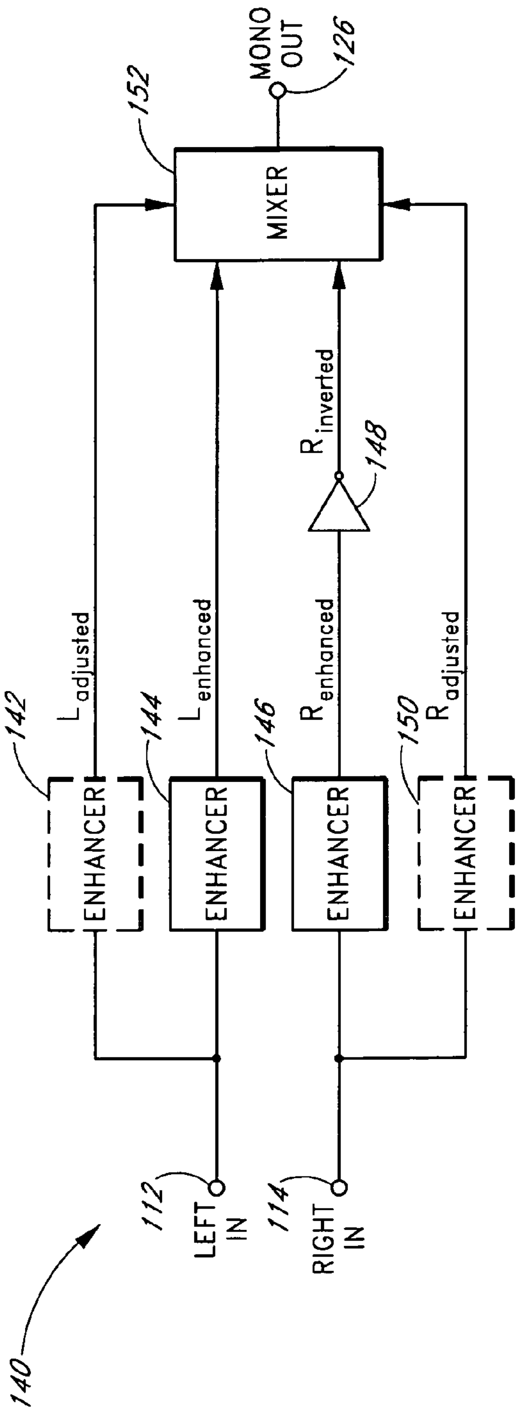
FIG. 1B is a block diagram of an audio enhancement system for generating an enhanced monaural image enhancement from a pair of stereo input signals, according to another embodiment of the invention.

FIG. 1B illustrates an audio enhancement system 140 in accordance with an embodiment of the invention. The audio enhancement system 140 does not create the sum and difference information prior to mixing the signals, as illustrated in the audio enhancement system 100 of FIG. 1A. In the audio enhancement system 140, an enhancer 144 receives the left input, $L_{IN}$, 112. The enhancer 144 selectively enhances the sound information in the left input, $L_{IN}$, 112 that provides a sense of spaciousness. The enhancer 144 produces an enhanced left channel signal, $L_{enhanced}$.

In an embodiment of the invention, the enhancer 144 comprises a perspective filter. In other embodiments of the invention, the enhancer 144 comprises a band-pass filter, an all-pass filter, a high-pass filter, a low-pass filter, or the like. In yet further embodiments of the invention, the enhancer 144 comprises a gain, a filter and a gain in series, a delay, or the like.

An output of the enhancer, $L_{enhanced}$ 144, provides a first input to a mixer 152.

Referring to FIG. 1B, an enhancer 146 receives the right input, $R_{IN}$, 114. The enhancer 146 selectively enhances the sound information in the right input, $R_{IN}$, 114 that provides a sense of spaciousness. The enhancer 146 produces an enhanced right channel signal, $R_{enhanced}$.

In an embodiment of the invention, the enhancer 146 comprises a perspective filter. In other embodiments of the invention, the enhancer 146 comprises a band-pass filter, an all-pass filter, a high-pass filter, a low-pass filter, or the like. In yet further embodiments of the invention, the enhancer 146 comprises a gain, a filter and a gain in series, a delay, or the like.

An output of the enhancer 146 provides an input to an inverter 148. The inverter 148 inverts the enhanced right channel signal $R_{enhanced}$ to produce an inverted right channel signal $R_{inverted}$. The output of the inverter 148 provides a second input to the mixer 152.

Again referring to FIG. 1B, an enhancer 142 receives the left input, $L_{IN}$, 112. The enhancer 142 phase adjusts the left input, $L_{IN}$, 112 relative to the right input $R_{IN}$, 114 to preserve audio information. This audio information could potentially be canceled and lost when the mixer 152 combines the signals. The enhancer 142 produces a phase adjusted left input signal $L_{adjusted}$.

In an embodiment of the invention, the enhancer 142 comprises an all-pass filter. In other embodiments of the invention, the enhancer 142 comprises a band-pass filter, a high-pass filter, a low-pass filter, a leading filter, a lagging filter, or the like. An output of the enhancer 142, $L_{adjusted}$, provides a third input to the mixer 152.

Again referring to FIG. 1B, an enhancer 150 receives the right input, $R_{IN}$, 114. The enhancer 150 phase adjusts the right input, $R_{IN}$, 114 relative to the right input $L_{IN}$, 112 to preserve audio information. This audio information could potentially be canceled and lost when the mixer 152 combines the signals. The enhancer 150 produces a phase adjusted right input signal $R_{adjusted}$.

In an embodiment of the invention, the enhancer 150 comprises an all-pass filter. In other embodiments of the invention, the enhancer 150 comprises a band-pass filter, a high-pass filter, a low-pass filter, a leading filter, a lagging filter, or the like. An output of the enhancer 150, $R_{adjusted}$, provides a fourth input to the mixer 152.

The mixer 152 receives the phase adjusted and enhanced left and right channel signals. The mixer 152 combines the enhanced left and right signals, $L_{enhanced}$ and $R_{inverted}$ with the phase adjusted left and right signals, $L_{adjusted}$ and $R_{adjusted}$ to produce the monaural output 126 with enhanced spatial impression.

Depending on the enhancers 144, 146 used in the audio enhancement system 140, as discussed previously, the system may need or may not need phase adjustment to prevent a loss of audio information. In embodiments of the audio enhancement system 140 that do not need phase adjustment, the enhancers 142, 150 are removed. The left input signal, $L_{IN}$, 112 provides the third input to the mixer 152 and the right input, $R_{IN}$, 114 provides the fourth input to the mixer 152. The mixer 152 combines the enhanced left and right signals, $L_{enhanced}$ and $R_{inverted}$ with the left and right input signals, $L_{IN}$, 112 and $R_{IN}$, 114 to produce the monaural output 126 with enhanced spatial impression.

Referring to FIGS. 1A and 1B, the audio enhancement systems 100 and 140 can be combined with other audio enhancement systems, such as, for example, bass enhancement systems, as described in U.S. Pat. No. 6,285,767, the entirety of which is hereby incorporated herein by reference. The enhancers 120, 122, 142, 144, 146, 150 can comprise additional audio enhancement techniques, such as, for example, height, width and depth perception enhancement. Such techniques, for example, are described in U.S. Pat. Nos. 4,748,669, 4,866,774, 5,661,808, 5,892,830, 6,597,791, 5,970,152, 6,281,749, and U.S. patent application Ser. No. 09/411,143, the entirety of which are hereby incorporated herein by reference.

Figure 1C:
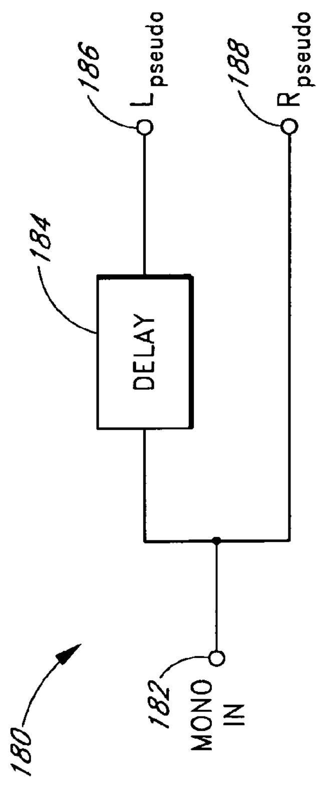
FIG. 1C is a block diagram of a monophonic input circuit for an audio enhancement system for generating an enhanced monaural image from a monophonic input signal, according to an embodiment of the invention.

FIG. 1C illustrates a monophonic input circuit 180 for the audio enhancement system 100, 140 for generating an enhanced monaural image from a monophonic input signal, according to an embodiment of the invention. A delay device 184 receives a monophonic input, $MONO_{IN}$, 182. The delay device 184 delays the monaural input signal, $MONO_{IN}$, 182 to provide a delayed monaural signal, which is also a left pseudo-stereophonic output signal $L_{pseudo}$, 186. In an embodiment, the delay is approximately 20 ms. In another embodiment, the delay may be more or less than 20 ms while still preserving the functional aspects of the invention. The monophonic input, $MONO_{IN}$, 182 also provides a right pseudo-stereophonic output signal, $R_{pseudo}$, 188.

The output signals, $L_{pseudo}$, 186 and $R_{pseudo}$, 188 provide input signals to the audio enhancement systems 100, 140 in place of the input stereophonic signals, $L_{IN}$, 112 and $R_{IN}$, 114. Thus, the audio enhancement systems 100, 140 in combination with the monophonic input circuit 180 generate spatially enhanced monaural audio information from a monophonic input signal.

In an embodiment of the invention, the audio enhancement system 100, 140 can be combined with other systems for generating pseudo-stereophonic outputs from a monophonic input, such as, for example, the audio enhancement systems described in U.S. Pat. Nos. 4,841,572 and 6,590,983, the entirety of which are hereby incorporated herein by reference.

In another embodiment of the invention, the audio enhancement system 100, 140, 180 can be combined with other audio enhancement systems to provide additional audio enhancement effects, such as, for example, those audio enhancement systems described in U.S. Pat. Nos. 4,819,269, 4,836,329, 5,319,713, 5,333,201, 5,459,813, 5,638,452, 5,771,295, 5,784,468, 5,850,453, 5,912,976, the entirety of which are hereby incorporated herein by reference.

In an embodiment, discrete circuit components implement the audio enhancement system 100, 140, or 180. In an additional embodiment, the left 112 and right 114 stereo input signals are part of an audio-visual composite signal. In another embodiment, the audio enhancement system 100, 140, or 180 is constructed as a digital and analog hybrid circuit. In yet another embodiment, the audio enhancement system 100, 140, or 180 is contained within a multi-chip module.

In another embodiment of the invention, a digital signal processor (DSP) implements the audio enhancement system 100, 140, or 180 in digital format. In another embodiment, a computer implements the audio enhancement system 100, 140, or 180 in software.

The computers comprise, by way of example, processors, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like.

In an embodiment, the software may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

The audio enhancement systems 100, 140, 180 of FIGS. 1A, 1B, and 1C generate enhanced audio information for reproduction on a single speaker. One can imagine many different speakers, each one with different speaker characteristics. There are many different enhancers 120, 122, 142, 144, 146, 150 with different characteristics to enhance the stereophonic inputs or pseudo-stereophonic inputs for reproduction on the variety of speakers.

FIGS. 2-8 illustrate the enhancer characteristics and system response characteristics for one embodiment of the audio enhancement system 100. In this example, the audio enhancement system 100 generates enhanced audio for reproduction on an average sized speaker for a monophonic television set. The television set speaker parameters, in this embodiment, are such that the audio enhancement system 100 does not require phase adjustment of the enhanced audio. Referring again to FIG. 1A, the audio enhancement system 100 does not include the enhancer 122. The output of the summing device 116 provides the first input to the mixer 124 and enhancer 120 comprises a filter.

Figure 2:
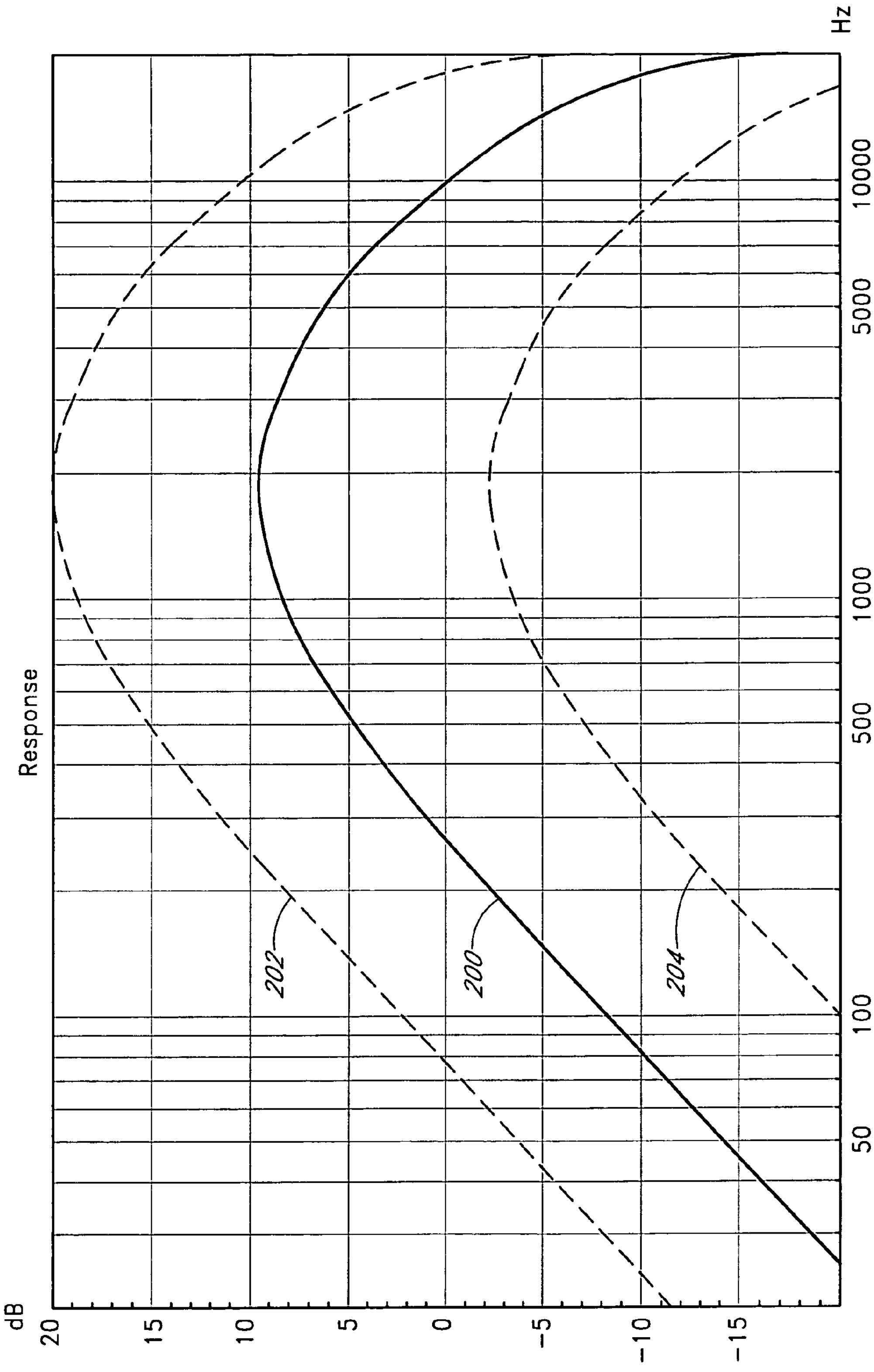
FIG. 2 is a graphical representation of the magnitude response of an enhancement curve according to an embodiment of the invention.

FIG. 2 is a graphical representation of a range of magnitude responses 200, 202, 204 of an enhancement curve of the filter 120, according to an embodiment of the audio enhancement system 100 that will be hereafter referred to as the "television embodiment." However, such reference is made only to provide a general idea of the speaker size suitable for this embodiment and not to imply that the embodiment is suitable only for a television. The same television embodiment is suitable for other consumer products and other applications as well. FIG. 2 shows the frequency in Hertz (Hz) on the x-axis and the amplitude in decibels (dB) on the y-axis. In one embodiment, the magnitude response range 202, 204 peaks between approximately 0 dB to approximately 20 dB in a mid-band frequency range.

In more detail, magnitude response range 202, 204 peaks between approximately 0 dB to approximately 20 dB at frequencies of between approximately 1 kHz to approximately 5 kHz. In further detail, the magnitude response 200 has an amplitude of approximately −18 dB at approximately 30 Hz and crosses 0 dB at approximately 260 Hz. The amplitude ramps up at approximately 19 dB per decade to a peak of approximately 9.5 dB at approximately 1.8 kHz. The amplitude rolls off at approximately 20 dB per decade to approximately −18 dB at approximately 20 kHz and crosses 0 dB at approximately 10 kHz.

Figure 3:
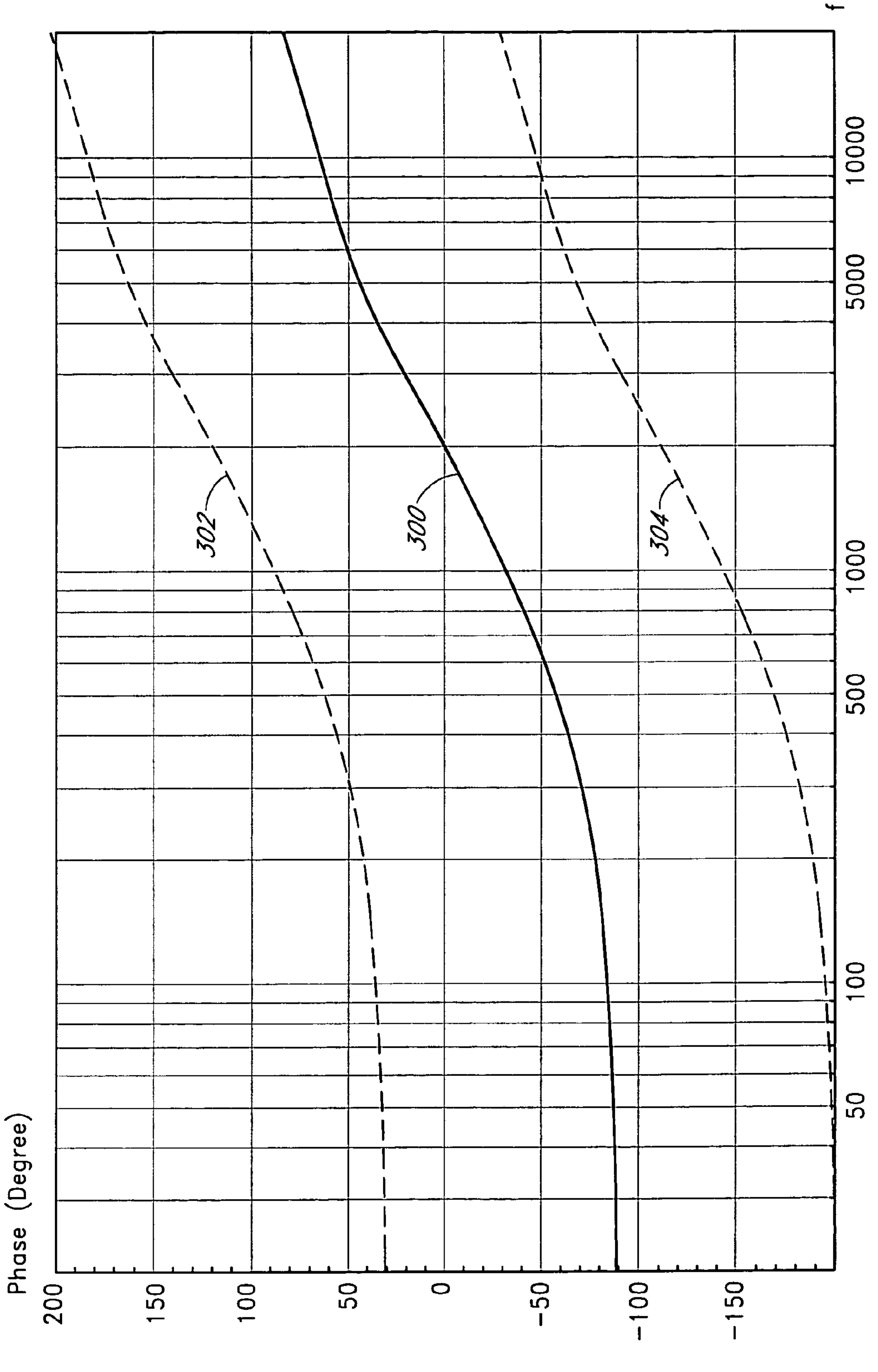
FIG. 3 is a graphical representation of the phase response of an enhancement curve according to an embodiment of the invention.

FIG. 3 is a graphical representation of a range of phase responses 300, 302, 304 of the enhancement curve of the filter 120 according to the television embodiment of the audio enhancement system 100. FIG. 3 shows the frequency in Hertz on the x-axis and the phase angle in degrees on the y-axis. In this embodiment, the phase response range 302, 304 has a phase angle of between approximately −180° to approximately 20° for low frequencies, between approximately −160° to approximately 150° for mid-band frequencies, and between approximately −70° to approximately 200° for high frequencies.

In more detail, the phase response range 302, 304 has a phase angle of between approximately −180° to approximately 20° at frequencies of between approximately 20 Hz to approximately 300 Hz. The phase angle is between approximately −180° to approximately 150° at frequencies of between approximately 300 Hz to approximately 4 kHz and continues to rise to between approximately −100° to approximately 200° at frequencies of between approximately 4 kHz to approximately 20 kHz. In further detail, the phase response 300 has a phase angle of approximately −90° at frequencies of between approximately 20 Hz to approximately 300 Hz. The phase response 300 rises to approximately 30° at approximately 3 kHz and continues to rise to approximately 80° at approximately 20 kHz at a rate of approximately 60° per decade.

Figure 4:
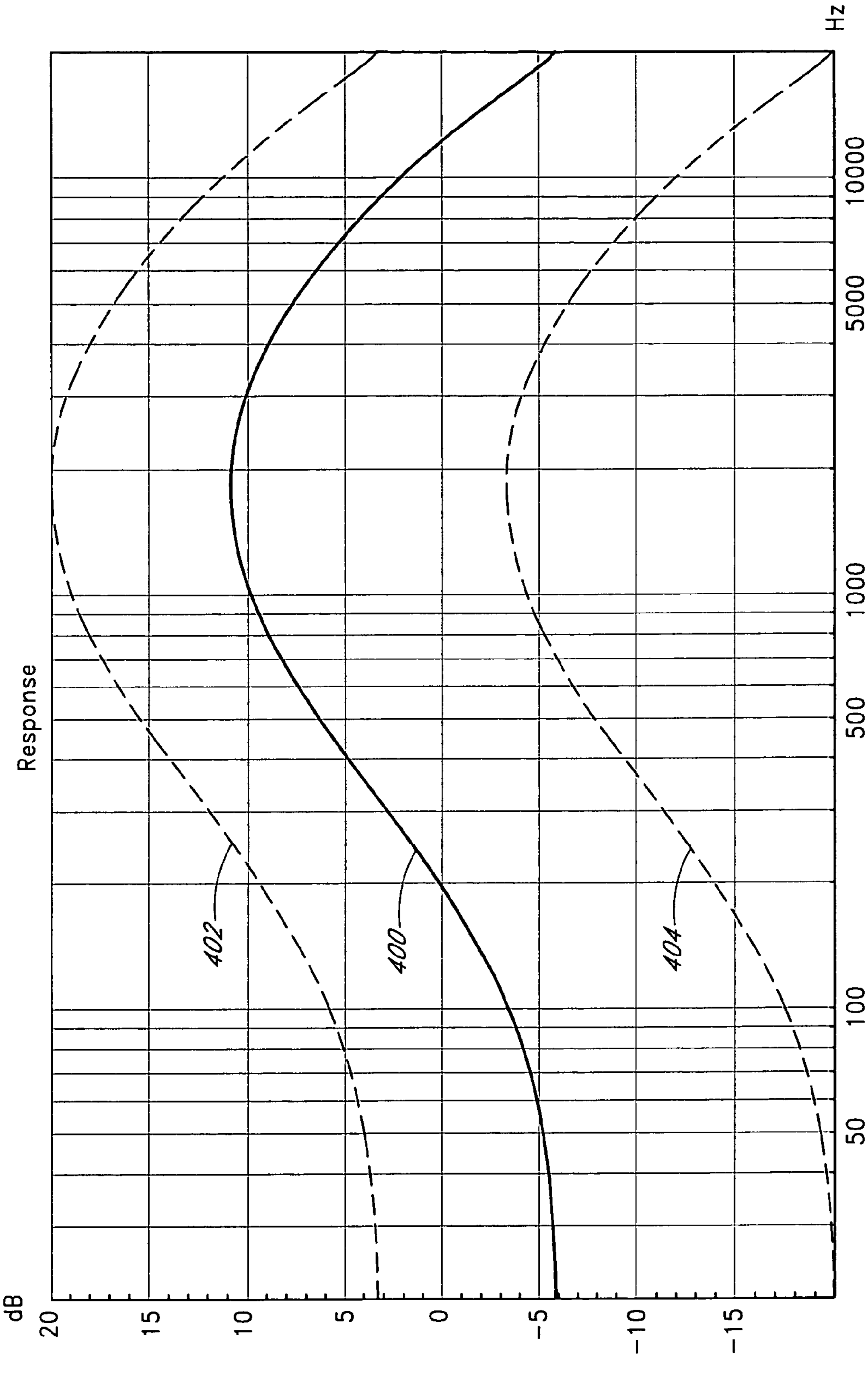
FIG. 4 is a graphical representation of a system magnitude response to unity input on the left channel and no input on the right channel, according to an embodiment of the invention.
Figure 6:
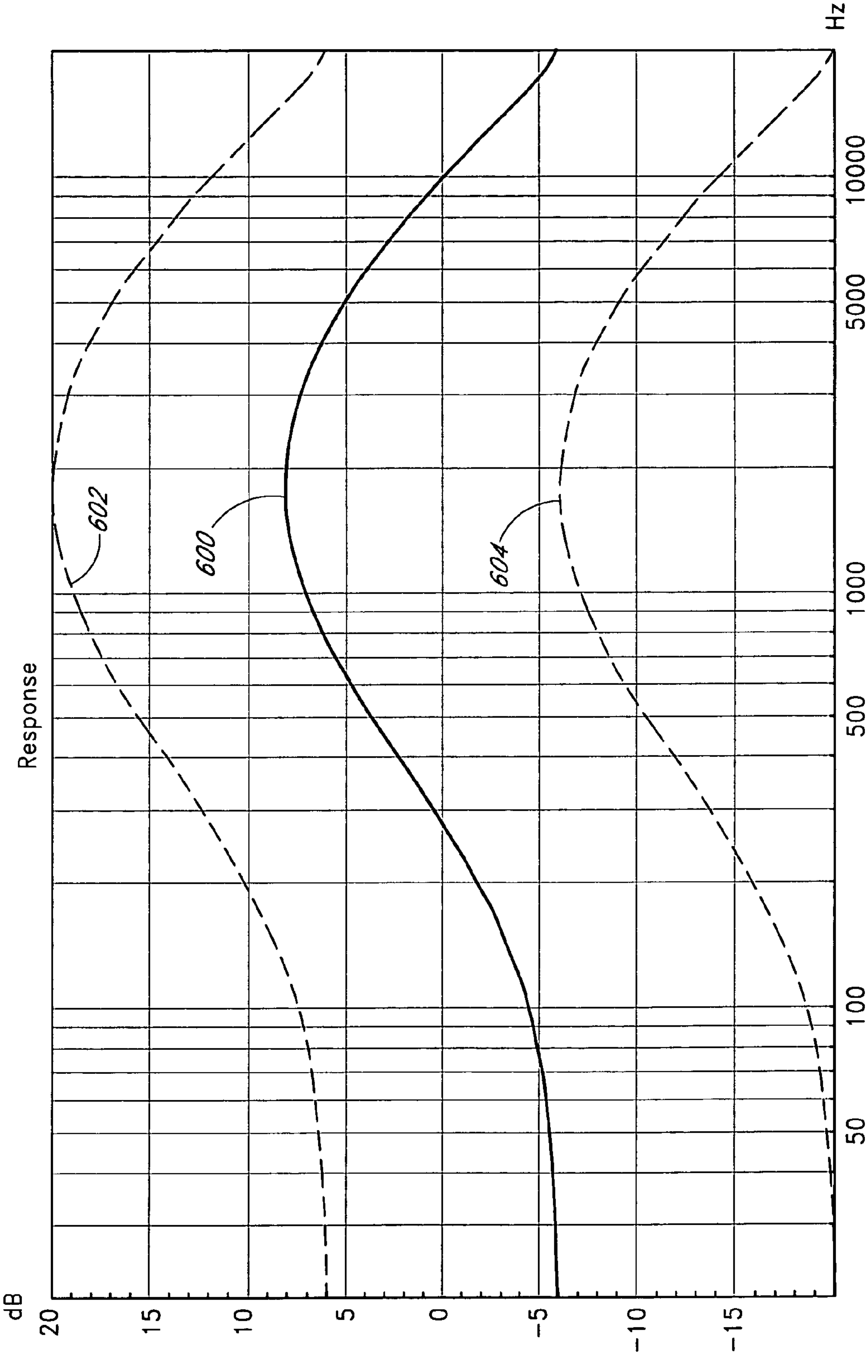
FIG. 6 is a graphical representation of a system magnitude response to no input on the left channel and unity input on the right channel, according to an embodiment of the invention.

In this example, the parameters of the enhancer 120 are chosen to enhance the audio for reproduction on a monophonic television set speaker. The circuit is designed such that the amplitude response of enhancer 120 is not 0 dB at the same frequency that the phase response is 0° or 180°. Otherwise, referring back to FIG. 1A, cancellation of some audio information may occur, for example, if no information is present at one of the $L_{IN}$ or $R_{IN}$ signal inputs. Referring to FIGS. 2 and 3, the amplitude of the filter response 200 is not approximately 0 dB in the same frequency range that the phase response 300 is approximately 0° or 180°. In addition to enhancing the audio, the filter does not disadvantageously shift the phase relationship of the audio signal. The audio enhancement system 100 preserves the audio information across the frequency spectrum. FIGS. 4 and 6 further illustrate the preservation of audio information for the television embodiment of the audio enhancement system 100.

FIG. 4 illustrates a range of acceptable magnitude responses 400, 402, 404 to a unity input on the left channel 112 and no input on the right channel 114 for the television embodiment of the audio enhancement system 100. In this embodiment, the audio enhancement system 100 comprises the filter 120 as characterized in FIGS. 2 and 3. The magnitude response range 402, 404 of FIG. 4 peaks at between approximately −3 dB to approximately 20 dB at frequencies of between approximately 1 kHz to approximately 3 kHz. In further detail, the magnitude response 400 of FIG. 4 has an amplitude of approximately −6 dB at approximately 20 Hz and crosses 0 dB at approximately 200 Hz. The amplitude 400 ramps up at approximately 13 dB per decade to a peak of approximately 11 dB at approximately 1.8 kHz. The amplitude 400 rolls off at approximately 18 dB per decade to approximately −6 dB at approximately 20 kHz and crosses 0 dB at approximately 12 kHz.

Figure 5:
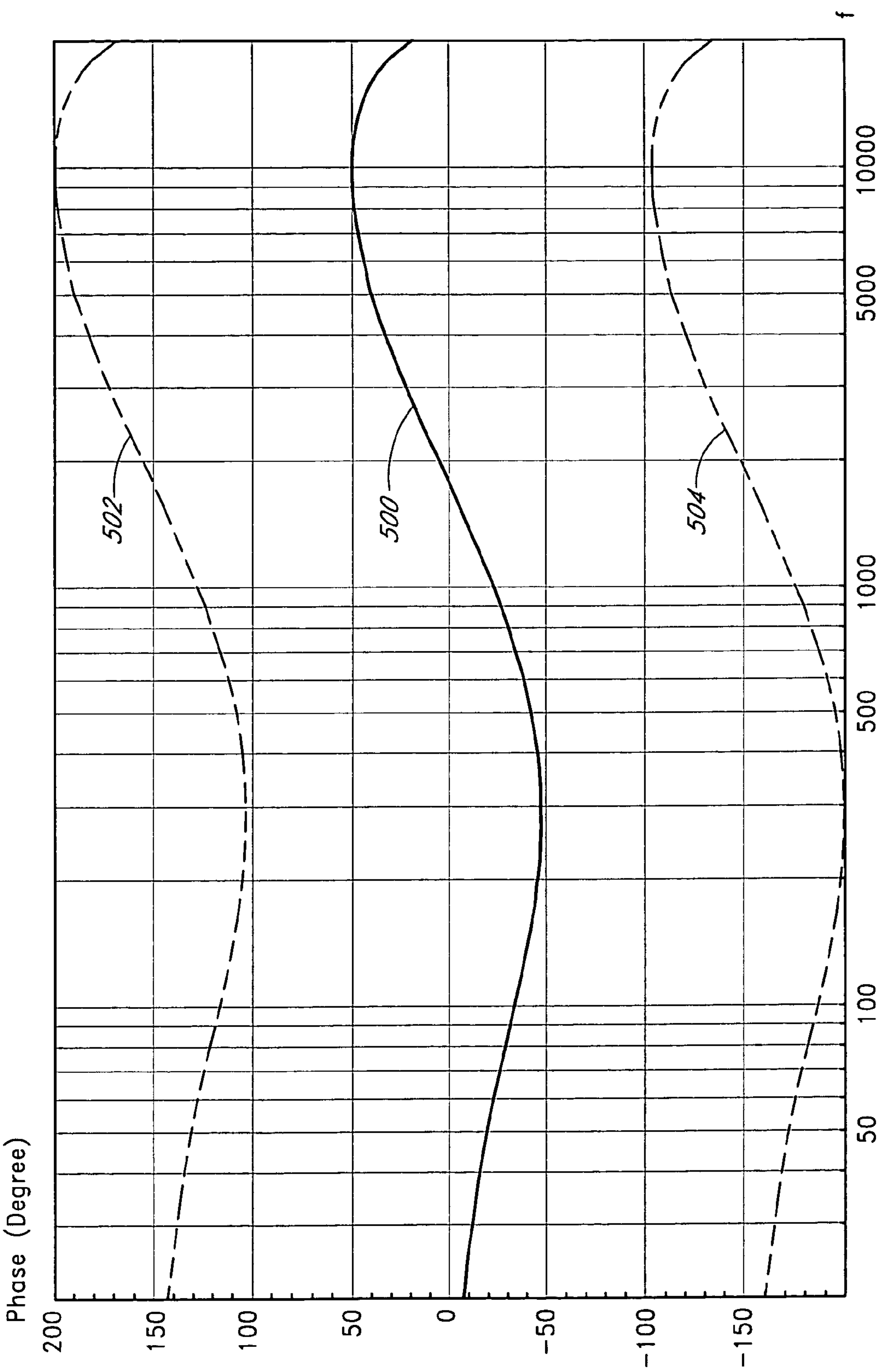
FIG. 5 is a graphical representation of a system phase response to unity input on the left channel and no input on the right channel, according to an embodiment of the invention.

FIG. 5 illustrates a range of acceptable phase responses 500, 502, 504 to a unity input on the left channel 112 and no input on the right channel 114 for the television embodiment of the audio enhancement system 100. In this embodiment, the audio enhancement system 100 comprises the filter 120 as characterized in FIGS. 2 and 3. The phase response range 502, 504 of FIG. 5 has a minimum phase angle of between approximately −200° to approximately 100° at frequencies between approximately 50 Hz to approximately 1 kHz and a maximum phase angle of between approximately −100° to approximately 2000° at frequencies of between approximately 5 kHz to approximately 20 kHz. In further detail, the phase response 500 is approximately −10° at approximately 20 Hz and drops to approximately −50° at approximately 300 Hz at a rate of approximately −45° per decade. The phase response 500 then increases to approximately 50° at approximately 10 kHz at a rate of approximately 90° per decade and crosses 0° at approximately 1.9 kHz. The phase response 500 then drops to approximately 20° at approximately 20 kHz at a rate of approximately 180° per decade.

FIG. 6 illustrates an acceptable magnitude response range 600, 602, 604 to a unity input on the right channel 114 and no input on the left channel 112 for the television embodiment of the audio enhancement system 100. In this embodiment, the audio enhancement system 100 comprises the filter 120 as characterized in FIGS. 2 and 3. The magnitude response range 602, 604 of FIG. 6 peaks at between approximately −6 dB to approximately 20 dB at frequencies of between approximately 1 kHz to approximately 3 kHz. In further detail, the magnitude response 600 has an amplitude of approximately −6 dB at approximately 20 Hz and crosses 0 dB at approximately 290 Hz. The amplitude 600 ramps up at approximately 14 dB per decade to a peak of approximately 8 dB at approximately 1.6 kHz. The amplitude 600 rolls off at approximately 18 dB per decade to approximately −6 dB at approximately 20 kHz and crosses 0 dB at approximately 10 kHz.

Figure 7:
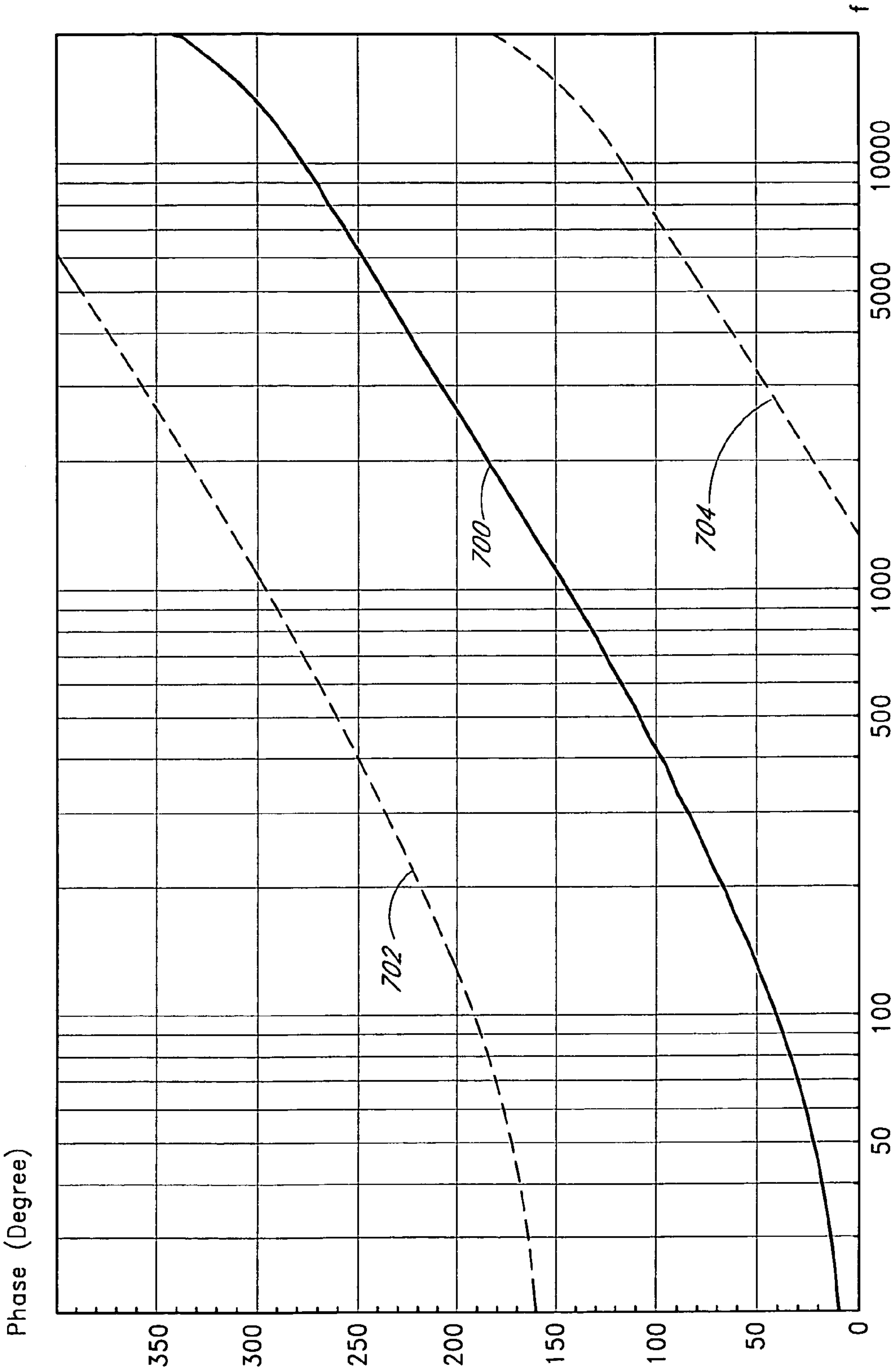
FIG. 7 is a graphical representation of a system phase response to no input on the left channel and unity input on the right channel, according to an embodiment of the invention.

FIG. 7 illustrates a range of acceptable phase responses 700, 702, 704 to a unity input on the right channel 114 and no input on the left channel 112 suitable for the television embodiment of the audio enhancement system 100. In this embodiment, the audio enhancement system 100 comprises the filter 120 as characterized in FIGS. 2 and 3. The phase response range 702, 704 of FIG. 7 has a range of phase angles between approximately 0° to approximately 80° at frequencies of between approximately 20 Hz to approximately 300 Hz, between approximately 60° to approximately 180° at frequencies of between approximately 300 Hz to approximately 2 kHz, and between approximately 180° to approximately 360° at frequencies of approximately 2 kHz to approximately 20 kHz. In further detail, the phase angle 700 is approximately 10° at approximately 20 Hz and rises to approximately 180° at approximately 1.7 kHz at a rate of approximately 100° per decade. The phase angle continues to rise to approximately 360° at approximately 1.7 kHz at a rate of approximately 135° per decade.

The responses 400 and 600 of FIGS. 4 and 6, respectively, show no frequencies with substantial signal attenuation across the frequency spectrum. As discussed previously, this is due to the parameters of the filter 120. As shown in FIGS. 2 and 3, the filter response curves 200 and 300 do not exhibit frequency responses having points at which the magnitude 200 is approximately 0 dB at the same frequencies where the phase angle 300 is either approximately 0° or 180°.

Again referring to FIGS. 4 and 6, the system magnitude responses 400 and 600 have similarly shaped curves over the frequency spectrum. In this embodiment, the audio enhancement system 100 has approximately equal gain in the left and right channel paths to preserve the original balance between the $L_{IN}$ and $R_{IN}$ signals. In other embodiments, the gains of the left and right channel paths may have more unequal gains.

Figure 8:
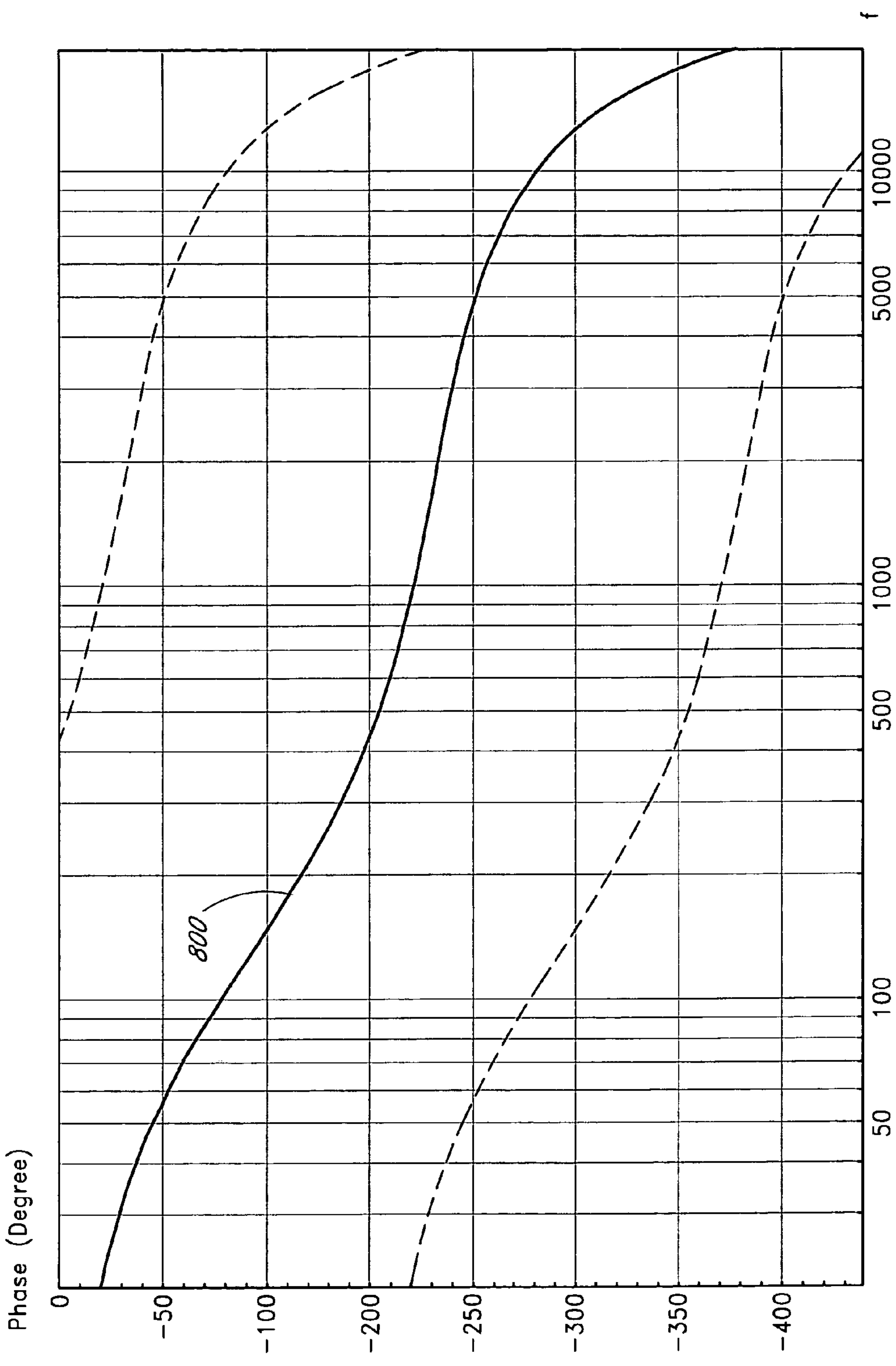
FIG. 8 is a graphical representation of a difference in phase response between the phase response of FIG. 5 and the phase response of FIG. 7, according to an embodiment of the invention.

FIG. 8 illustrates a phase difference 800 between the phase response 500 of FIG. 5 and the phase response 700 of FIG. 7. That is, FIG. 8 shows the phase angle 800 at the output 126 between an input on the left channel 112 with no input on the right channel 114, and an input on the right channel 114 with no input on the left channel 112. As shown in FIG. 8, the phase angle does not approach 0° across the full audio spectrum from 20 Hz to 20 kHz indicating that audio information in the input channels will not be lost in the audio enhancement system 100 from phase cancellation.

In further detail, the phase difference 800 is approximately −20° at approximately 20 Hz and drops to approximately −180° at approximately 1.7 Hz at a rate of approximately 115° per decade. At approximately 1.7 kHz the phase difference between the left and right channels is approximately 180°. At the same frequency, however, the overall circuit 100 has a gain greater than 0 dB preserving information at the 1.7 kHz range that might otherwise be cancelled from out of phase mixing at the output stage. The phase difference 800 further drops to approximately −360° at approximately 20 kHz.

Referring to FIGS. 1A, 1B, and 1C, one can again imagine many different speakers, each one with different speaker characteristics. As discussed previously, there are many different enhancers 120, 122, 142, 144, 146, 150 with different characteristics to enhance the stereophonic inputs or pseudo-stereophonic inputs for reproduction on the variety of speakers.

Figure 9:
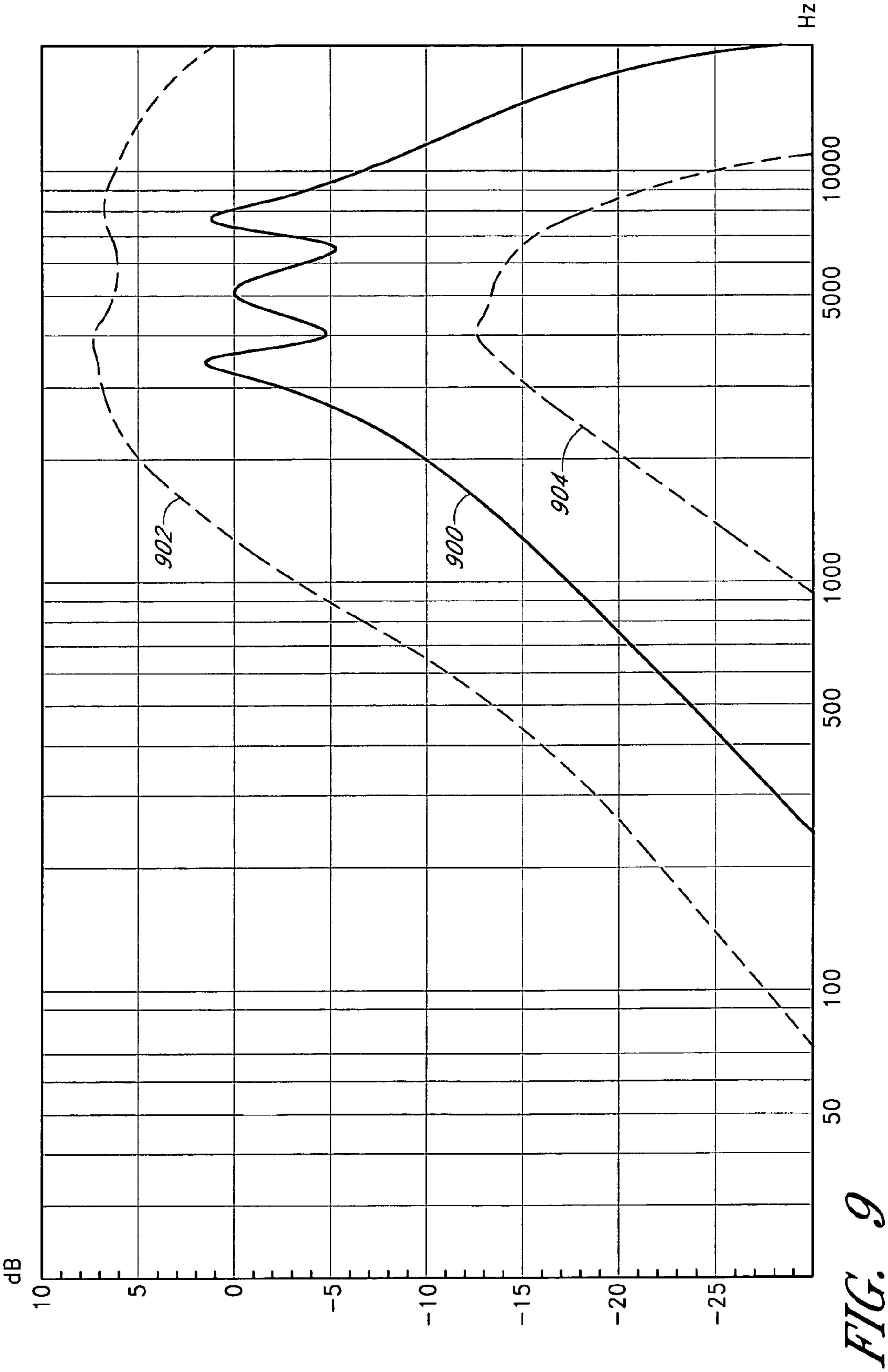
FIG. 9 is a graphical representation of the magnitude response of an enhancement curve, according to an embodiment of the invention.
Figure 10:
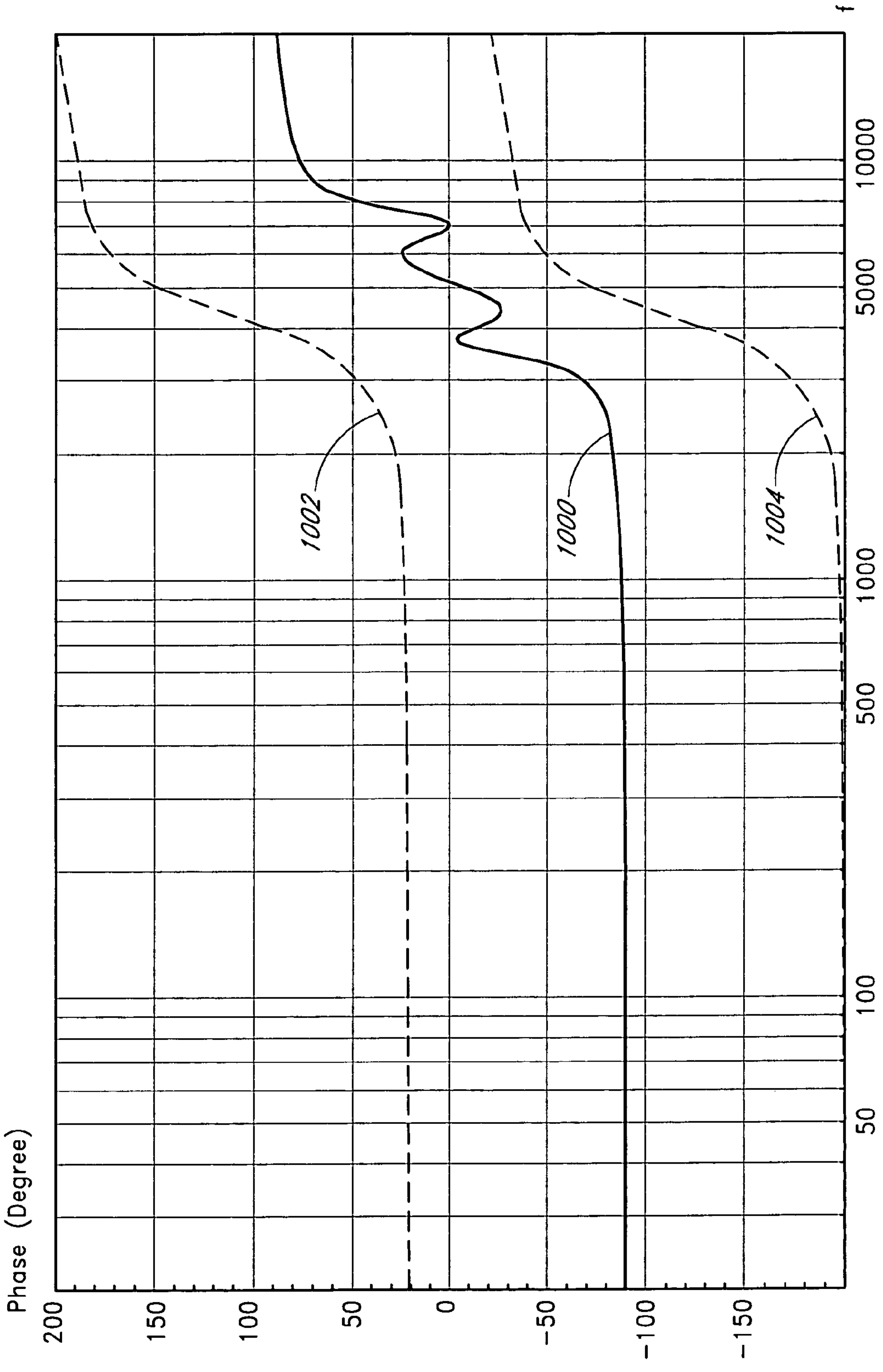
FIG. 10 is a graphical representation of the phase response of an enhancement curve, according to an embodiment of the invention.

FIGS. 9 and 10 illustrate the enhancer characteristics of enhancer 120 for one embodiment of the audio enhancement system 100. In this example, the audio enhancement system 100 generates enhanced audio for reproduction on a cellular telephone. The enhancer 120 in this embodiment comprises a perspective filter 120. The parameters of the filter 120 are chosen to enhance audio for reproduction of the cell phone speaker.

FIG. 9 is a graphical representation of a range of magnitude responses 900, 902, 904 of an enhancement curve of the filter 120, according to one embodiment of the cell phone implementation of the invention. In this embodiment, the magnitude response range of the magnitude responses 902, 904 peaks between approximately −15 dB to approximately 10 dB in a mid-band frequency range.

In further detail, the magnitude response 900 has an amplitude of approximately −30 dB at approximately 250 Hz and ramps up at approximately 23 dB per decade to approximately −10 dB at approximately 2 kHz. The magnitude response 900 rises to a peak of approximately 2 dB at approximately 3.5 kHz, drops to a minimum of approximately −4.5 dB at approximately 4 kHz. The magnitude response 900 rises to a peak of approximately 0 dB at approximately 5 kHz and drops to a minimum of approximately −5 dB at approximately 6.4 kHz. The magnitude response rises to a peak of approximately 2 dB at a frequency of approximately 7.7 kHz and drops to approximately −27 dB at approximately 20 kHz at a rate of approximately 64 dB per decade.

FIG. 10 is a graphical representation of a range of phase responses 300, 302, 304 of the enhancement curve of the filter 120 according to one embodiment of cell phone implementation of the invention. In this embodiment, the range of the phase responses 1002, 1004 has a phase angle of between approximately −200° to approximately 30° at frequencies of between approximately 20 Hz to approximately 3 kHz. The phase angle is between approximately −180° to approximately 200° at frequencies of between approximately 3 kHz to approximately 20 kHz. In further detail, the phase response 1000 has a phase angle of approximately −90° at frequencies of between approximately 20 Hz to approximately 300 Hz. The phase response 1000 rises to approximately 30° at approximately 3 kHz, continues to rise to a peak of approximately 0° at approximately 3.5 kHz and drops to a minimum of −20° at approximately 4.5 kHz. The phase response 1000 rises to a peak of approximately 25° at approximately 6 kHz and drops to approximately 0 dB at approximately 7 kHz. The phase response 1000 rises to approximately 90° at approximately 20 kHz.

Figure 11:
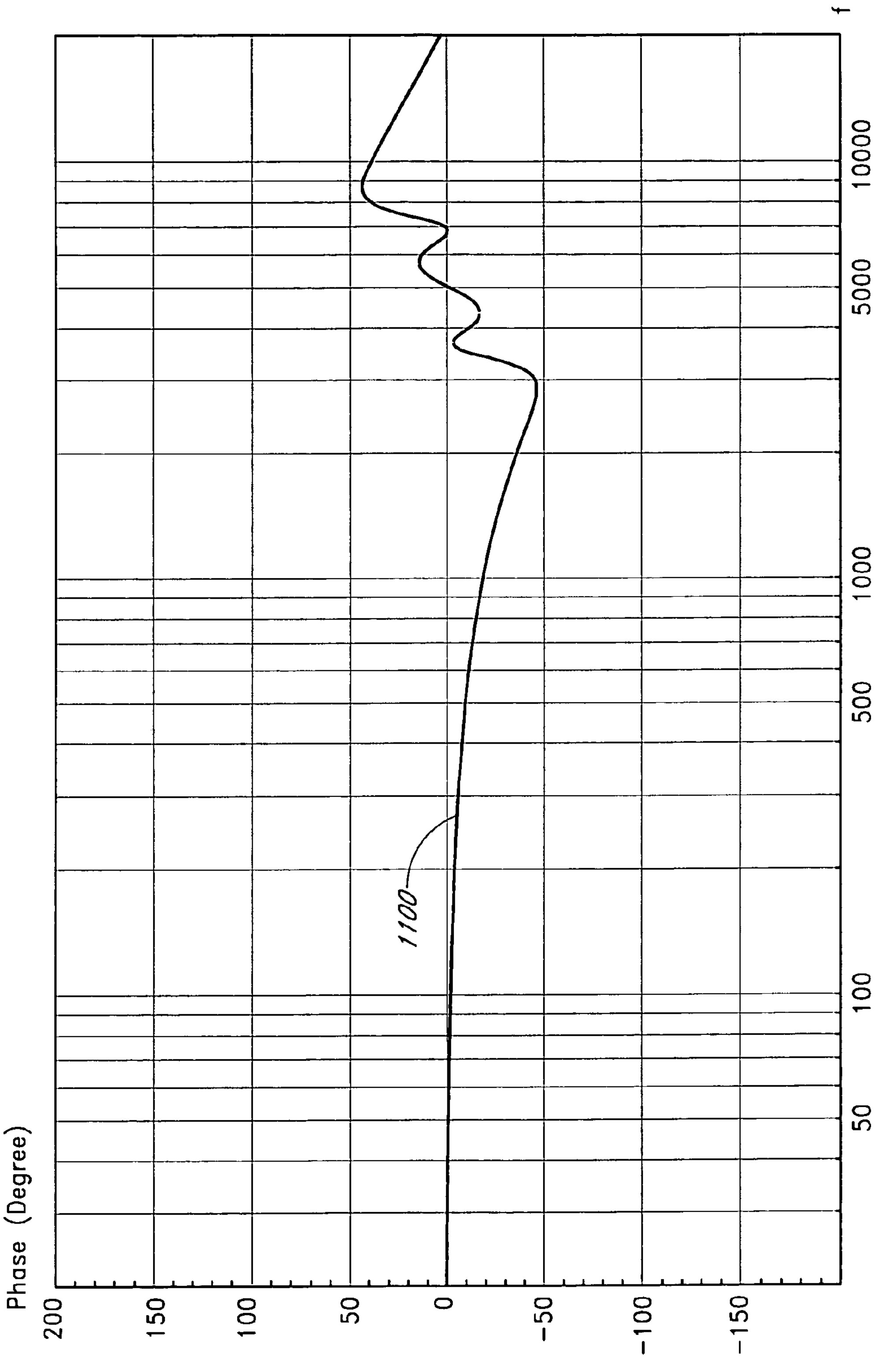
FIG. 11 is a graphical representation of a difference in phase response between a system phase response to unity input on the left channel and no input on the right channel, and a system phase response to no input on the left channel and unity input on the right channel, before phase adjustment, according to an embodiment of the invention.
Figure 12:
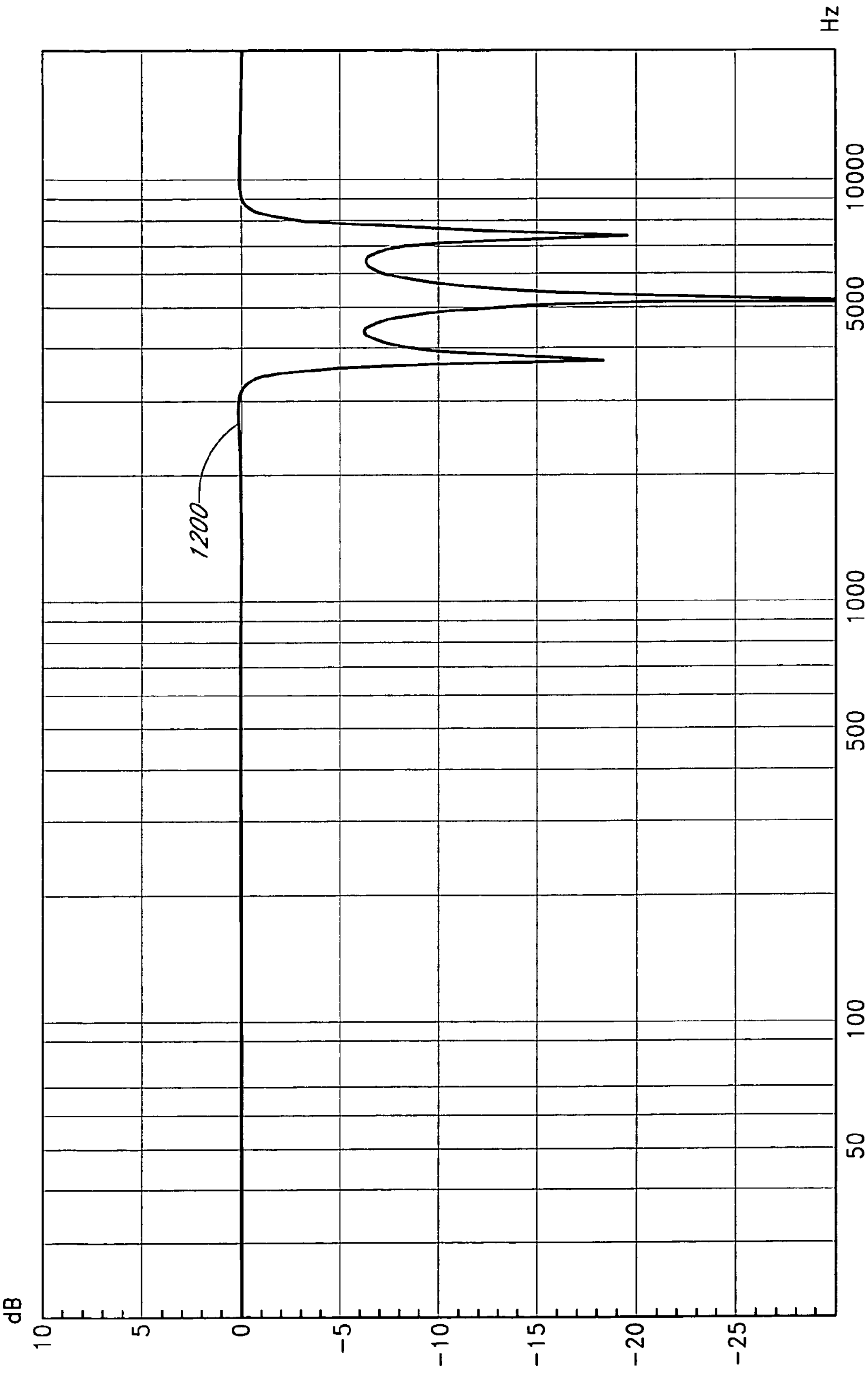
FIG. 12 is a graphical representation of a system magnitude response to no input on the left channel and unity input on the right channel, before phase adjustment, according to an embodiment of the invention.

In this example, the parameters of the filter 120 are chosen to enhance the audio for reproduction on a cell phone speaker. Referring to FIGS. 9 and 10, it can be seen that the amplitude of the filter response 900 is approximately 0 dB in the same frequency range that the phase response 1000 is approximately 0°. In addition to enhancing the audio, the filter 120 shifts the phase of the enhanced difference signal in this embodiment. If uncorrected, a loss of audio information occurs at the frequencies where the filter magnitude response is approximately 0 dB and the filter phase response is approximately 0°. FIGS. 11 and 12 illustrate the loss of audio information when the embodiment of the audio enhancement system 100 for the cell phone does not adjust the relative phase of the enhanced signals.

FIG. 11 illustrates a difference in phase response 1100 between the left channel phase response and the right channel phase response without the enhancer 122 for one embodiment of the cell phone implementation of the audio enhancement system 100. That is, FIG. 11 shows the phase response difference at the output 126 between the phase response generated by a unity input on the left channel 112, $L_{IN}$ and no input on the right channel 114, $R_{IN}$ and the phase response generated by no input on the left channel 112, $L_{IN}$ and a unity input on the right channel 114, $R_{IN}$.

The audio enhancement system utilized to generate the phase response difference 1100 is an embodiment of the audio enhancement system 100 with the filter 120 as described in FIGS. 9 and 10 and without the enhancer 122. Thus, the audio enhancement system 100 without the enhancer 122 does not separately adjust the overall relative phase of the enhanced signals.

As shown in FIG. 11, the phase difference 1100 is approximately 0° at approximately 3.6 kHz, approximately 5.1 kHz, and approximately 7 kHz in the cell phone embodiment of the audio enhancement system 100 without the enhancer 122. Referring again to FIG. 1A, if the output of the summing device 116 and the enhancer 120 are combined in mixer 124, cancellation of the audio information can occur where the phase difference is approximately 0°. In this embodiment, the audio information is lost at approximately 3.6 kHz, 5.1 kHz, and 7 kHz. Accordingly, at the points where the phase difference is approximately 0°, the monophonic output 126 may lose at least a portion of the spatial content of the difference information from cancellation at the mixer 126.

The attenuation of the audio signal at approximately 3.6 kHz, 5.1 kHz, and 7 kHz is also shown in FIG. 12. FIG. 12 illustrates a magnitude response 1200 from no input on the left channel 112 and a unity input on the right channel for the embodiment of the audio enhancement system 100 for use in a cell phone with no phase adjustment. In this embodiment, the magnitude response range 1200 of FIG. 12 is flat at frequencies of between approximately 20 Hz to approximately 3 kHz and between approximately 9 kHz to approximately 20 kHz. At frequencies between approximately 3 kHz to approximately 9 kHz, the amplitude is attenuated.

In further detail, the magnitude response 1200 of FIG. 12 has an amplitude of approximately 0 dB at frequencies of approximately 20 Hz to approximately 3 kHz. The magnitude response 1200 drops considerably in magnitude as shown at approximately 3.6 kHz, approximately 5.1 kHz, and at approximately 7 kHz. Without correction, a substantial loss of audio information can occur at these frequencies due to the frequency response of the enhancer 120 designed to correspond to the cell phone speaker characteristics.

In addition, the cell phone embodiment of the audio enhancement system 100 is designed to keep the magnitude response of the inputs symmetrical, i.e., approximately equal, to prevent one input signal from overwhelming the other input signal. However, when the enhanced signals having opposite phase and nearly equal magnitude are added, certain information present in the signals may cancel.

To avoid losing audio information when the sum and difference signals are combined to generate the enhanced monaural output 126, embodiments of the audio enhancement systems 100, 140 comprise the enhancer 122, 142, and/or 150 to adjust the phase of the sum signal. As discussed previously, to prevent audio signal cancellation loss, other embodiments of the audio enhancement system 100, 140 can adjust the phase of the sum signal, the difference signal, the sum and difference signals, the enhanced difference signal, or the input signals. What is important is ensuring the proper relative phase of the signal paths which can be accomplished by modifying one or, as shown in FIGS. 1A and 1B, by modifying both of the signal paths.

Figure 13:
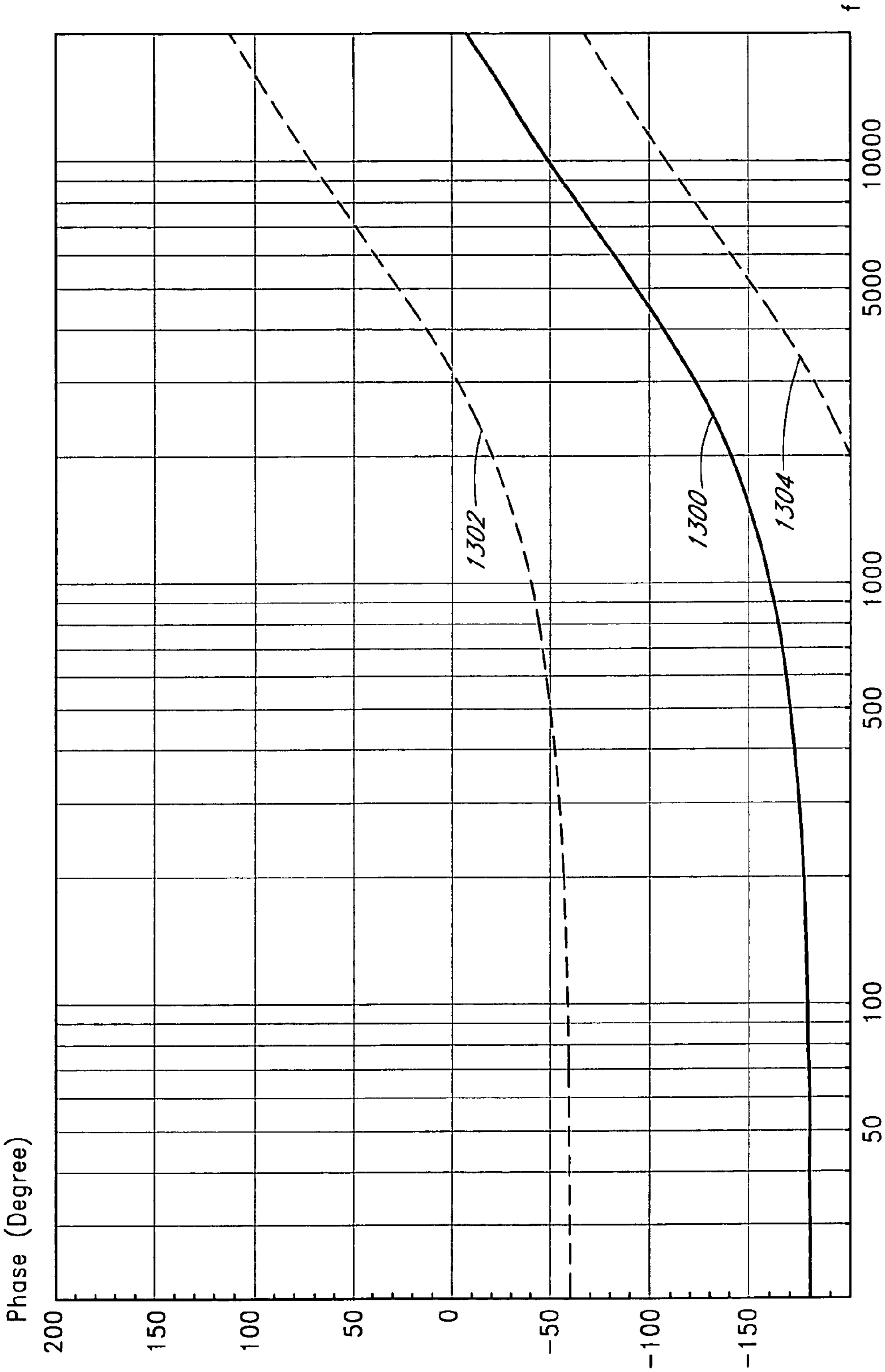
FIG. 13 is a graphical representation of the phase response of a phase adjustment curve, according to an embodiment of the invention.

FIG. 13 illustrates the phase characteristics of the phase adjustment enhancer 122 used for the cell phone embodiment. In this embodiment, enhancer 122 comprises an all-pass filter, as characterized by FIGS. 9 and 10. The output of the filter 122 provides the first input to the mixer 124 and the output of filter 120 provides the second input to the mixer 124.

FIG. 13 illustrates a range of acceptable phase-versus-frequency responses 1300, 1302, 1304 of the filter 122. In this embodiment, the range of phase angles 1302, 1304 of FIG. 13 is between approximately −200° to approximately −60° for low frequencies, between approximately −200° to approximately 20° for mid-band frequencies, and between approximately −120° to approximately 110° for high frequencies.

In further detail, the phase angle 1300 of FIG. 13 is between approximately −180° to approximately −100° for frequencies of between approximately 20 Hz to approximately 3 kHz. The phase angle 1300 is between approximately −150° to approximately 0° for frequencies of between approximately 1 kHz to approximately 20 kHz.

The magnitude-versus-frequency response of the all-pass filter 122 used in the cell phone embodiment of the audio enhancement system 100 is flat across the frequency spectrum, from 20 Hz to 20 kHz. An acceptable magnitude response range may vary from between −10 dB to 10 dB.

In another embodiment, the filter 122 modifies both phase and amplitude. In further embodiments of the invention, the filter 122 comprises a band-pass filter, a high-pass filter, a low-pass filter, a phase-leading filter, a phase-lagging filter, or other devices having phase adjusting characteristics.

Referring to FIG. 1A, the filter 122 adjusts the direct component (L+R) of the stereophonic input relative to the filtered ambient component $(L-R)_{enhanced}$ of the stereophonic input. The filter produces the phase adjusted sum signal $(L+R)_{enhanced}$. As described previously, the output of the enhancer 122 provides the first input to the mixer 124, and the output of the enhancer 120 provides the second input to the mixer 124.

The mixer 124 combines the enhanced difference component $(L-R)_{enhanced}$ with the phase adjusted direct component $(L+R)_{enhanced}$ to produce the monaural output 126 with enhanced spatial impression.

Figure 14:
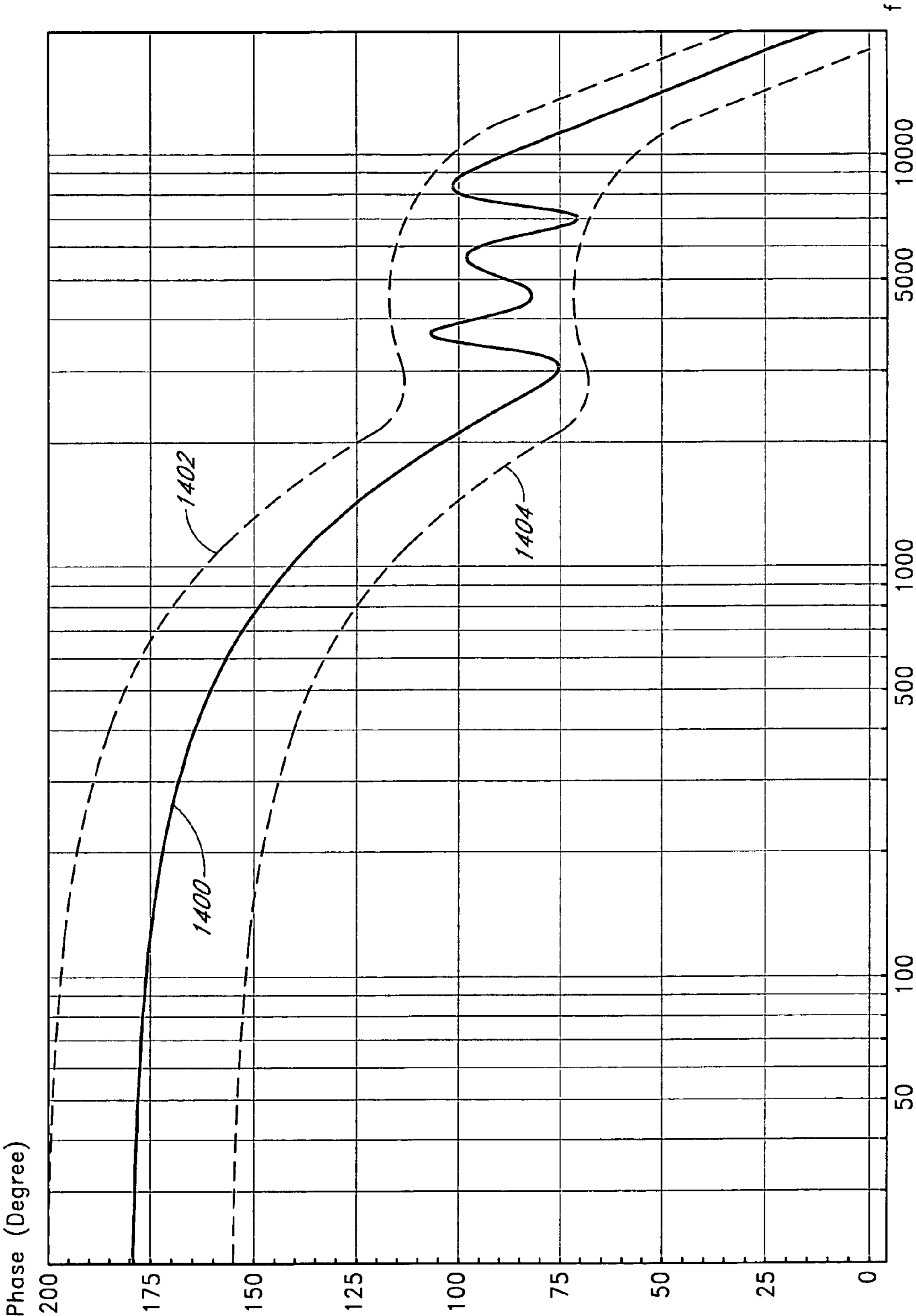
FIG. 14 is a graphical representation of a difference in phase response between a system phase response to unity input on the left channel and no input on the right channel, and a system phase response to no input on the left channel and unity input on the right channel, after phase adjustment, according to an embodiment of the invention.

FIG. 14 illustrates a range of acceptable differences in phase response of the audio enhancement system 100 for use with the cell phone speaker. That is, FIG. 14 shows the phase response difference 1400, 1402, 1404 at the output 126 between the phase response generated by a unity input on the left channel 112, $L_{IN}$ and no input on the right channel 114, $R_{IN}$ and the phase response generated by no input on the left channel 112, $L_{IN}$ and a unity input on the right channel 114, $R_{IN}$. The audio enhancement system 100 in this embodiment comprises the all-pass filter 122 as characterized by FIG. 13 and the perspective filter 120 as characterized in FIGS. 9 and 10.

As shown in FIG. 14, in the cell phone embodiment, the range of the difference in the phase angle 1402, 1404 is between approximately 125° to approximately 200° at low frequencies, and is between approximately 50° to approximately 125° at approximately 3 kHz to approximately 10 kHz. The phase response difference further drops to between approximately 0° to approximately 75° at approximately 20 kHz.

As shown in FIG. 14, the phase response difference 1400, 1402, 1404 has a phase angle of greater than 0° and less than 180° across the frequency spectrum, from approximately 20 Hz to 20 kHz. This is the result of phase adjusting the sum component (L+R) relative to the enhanced difference component $(L-R)_{enhanced}$ in filter 122. When the mixer 124 combines the phase adjusted direct component $(L+R)_{enhanced}$ and ambient component $(L-R)_{enhanced}$, phase cancellation of the difference information is reduced. The audio enhancement system 100 preserves the otherwise canceled audio information present in the left and right stereophonic input signals. The sound reproduced when the enhanced monophonic output 126 drives the cell phone speaker gives the impression that the sound source is wider than the speaker.

Figure 15:
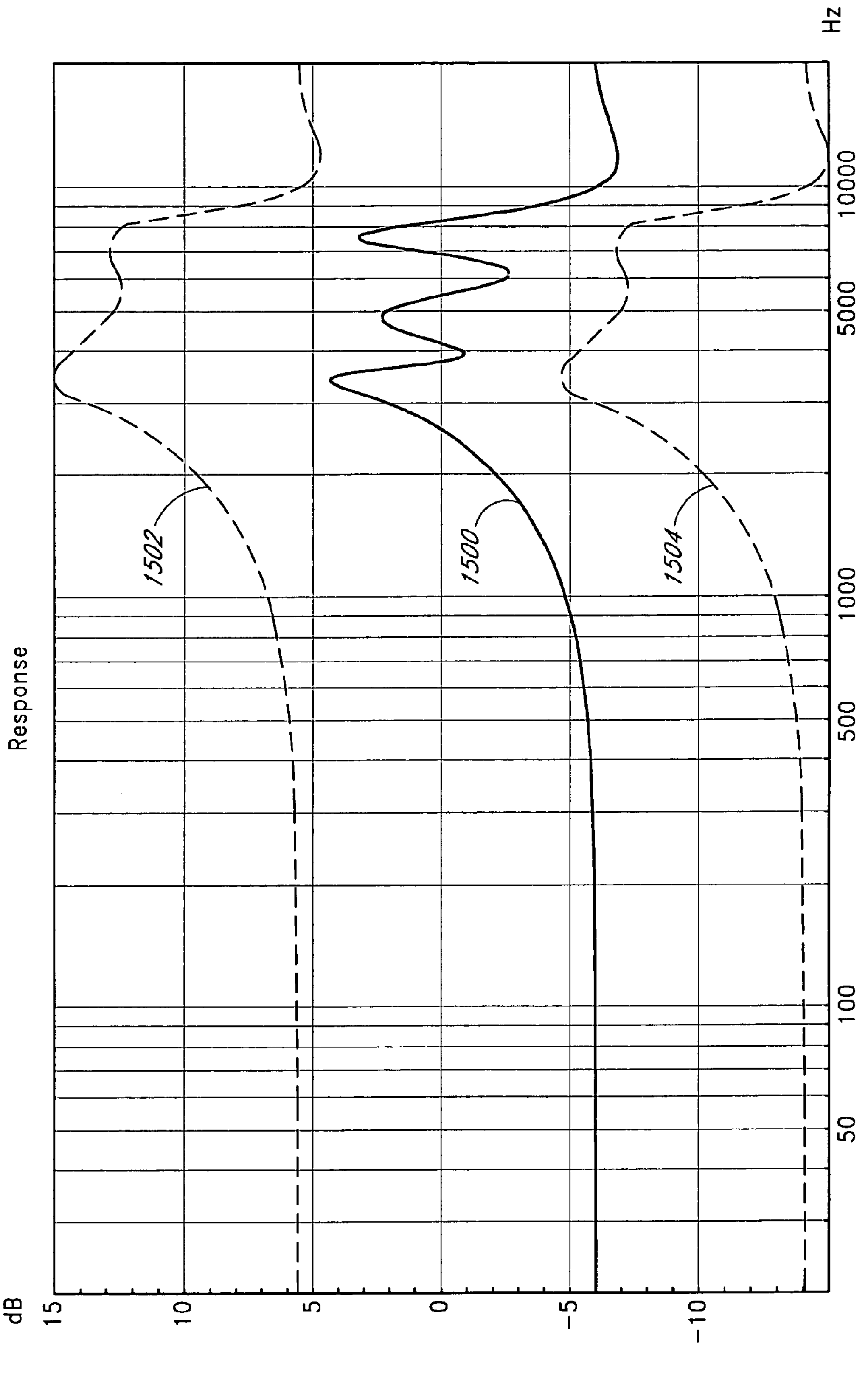
FIG. 15 is a graphical representation of a system magnitude response to unity input on the left channel and no input on the right channel, according to an embodiment of the invention.

FIG. 15 illustrates a range of magnitude responses 1500, 1502, 1504 of the audio enhancement system 100 to a unity input on the left channel 712 $L_{IN}$ and no input on the right channel 714 $R_{IN}$. The audio enhancement system 100 represented in FIG. 15 is the cell phone embodiment with phase adjustment. In this embodiment, the amplitude range 1502, 1504 is between approximately −15 dB to approximately 5 dB for low frequencies, between approximately −10 dB to approximately 15 dB for mid-band frequencies, and approximately −15 dB to approximately 12 dB for high frequencies.

Figure 16:
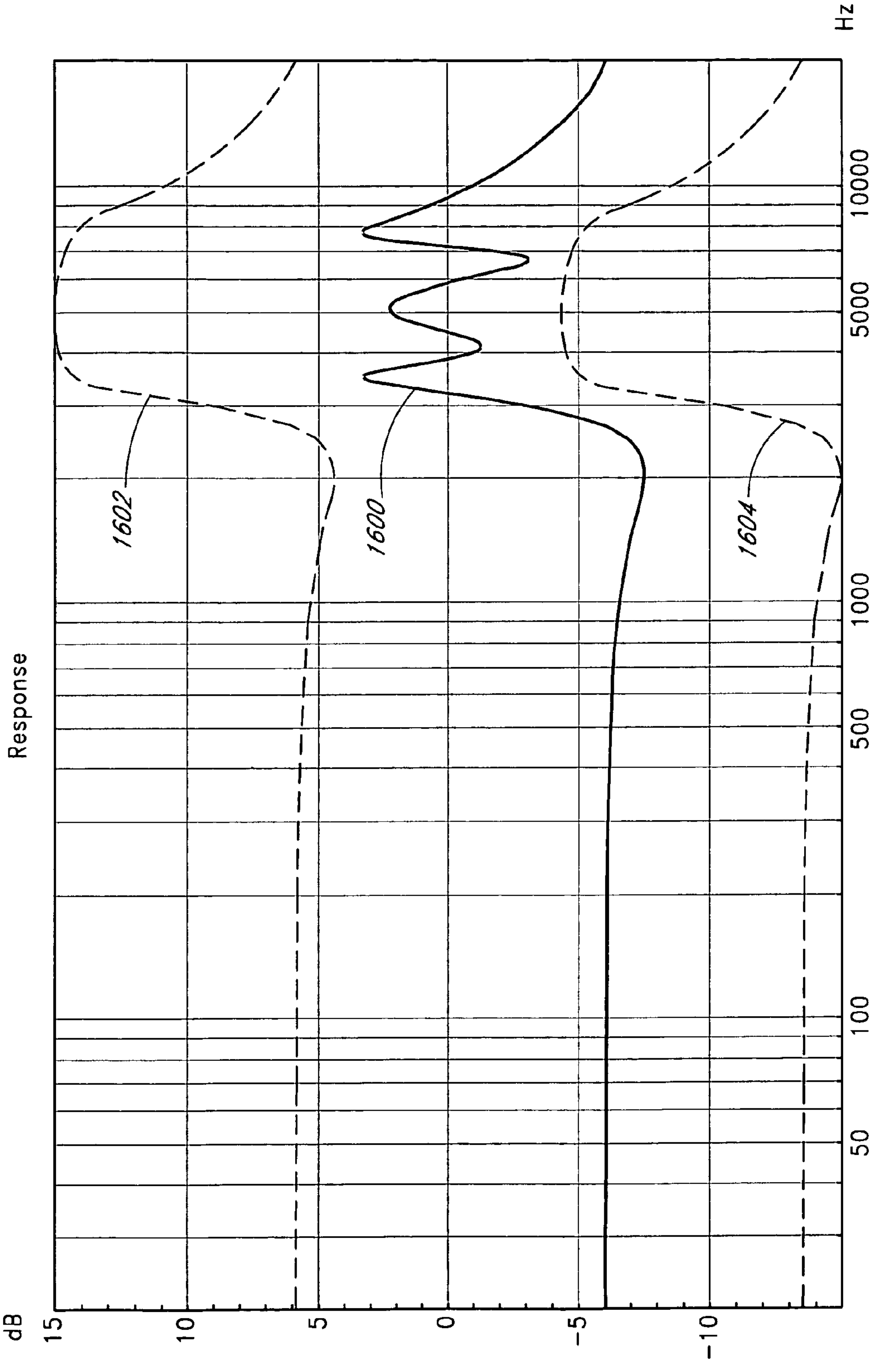
FIG. 16 is a graphical representation of a system magnitude response to no input on the left channel and unity input on the right channel, according to an embodiment of the invention.

FIG. 16 illustrates a range of magnitude responses 1600, 1602, 1604 of the system 100 to no input on the left channel 712 $L_{IN}$ and a unity input on the right channel 714 $R_{IN}$. The audio enhancement system 100 represented in FIG. 16 is the cell phone embodiment with phase adjustment. In this embodiment, the range of amplitudes 1602, 1604 is between approximately −13 dB to approximately 8 dB for low frequencies, between approximately −15 dB to approximately 15 dB for mid-band frequencies, and approximately −12 dB to approximately 12 dB for high frequencies.

Referring to FIGS. 15 and 16, the system magnitude responses 1500 and 1600, respectively, do not have frequencies with substantial attenuation. The cell phone embodiment of the audio enhancement system 100 comprising the enhancer 122 and enhancer 120 preserves the audio information that would otherwise be lost.

In addition, the system magnitude responses 1500 and 1600 have similarly shaped curves over the frequency spectrum. In this embodiment, the audio enhancement system 100 ideally has approximately equal gain in the left and right channel paths.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of generating a monophonic output from a pair of input signals, the method comprising:

receiving left and right stereo inputs to an audio enhancement system;

phase adjusting the left input to produce left phase adjusted information;

enhancing the left input with a first perspective filter to produce left enhanced information, the first perspective filter operative to enhance spatial characteristics of the left input;

enhancing the right input with a second perspective filter to produce right enhanced information, the second perspective filter operative to enhance spatial characteristics of the right input;

phase adjusting the right input to produce right phase adjusted information;

inverting the right enhanced information to produce inverted right enhanced information; and combining at least a portion of the left phase adjusted information, at least a portion of the right phase adjusted information, at least a portion of the left enhanced information, and at least a portion of the inverted right enhanced information to generate an enhanced monophonic output, wherein phase adjusting the left and right inputs preserves audio information during said combining.

2. The method of claim 1 wherein the act of enhancing the left input and the act of enhancing the right input comprises adjusting an amplitude of the left input and adjusting an amplitude of the right input.

3. The method of claim 1 wherein the act of enhancing the left input and the act of enhancing the right input comprises adjusting an amplitude of the left input and adjusting the amplitude and phase of the right input.

4. The method of claim 3 wherein adjusting the phase of the left and right inputs modifies a frequency response at frequencies where the frequency responses of an audio enhancement system have approximately equal amplitudes and opposite phases so as to preserve audio information at the frequencies.

5. The method of claim 1 further comprising reproducing audio from the enhanced monophonic output through a speaker wherein the acts of enhancing are dependent on speaker characteristics of the speaker.

6. The method of claim 1 wherein the acts of enhancing the left input and the right input comprise filtering and adjusting the gain of the left input and the right input.

7. The method of claim 1 wherein the acts of phase adjusting to produce left and right phase adjusted information, enhancing to produce left and right enhanced information, inverting the right enhanced information, and combining to generate the enhanced monophonic output are performed by a digital signal processor.

8. The method of claim 1 further comprising synthetically generating the first and second inputs.

9. The method of claim 8 wherein the act of synthetically generating the first and second inputs comprises providing a monophonic input as the first input and delaying the monophonic input to produce the second input.

10. An audio enhancement apparatus to produce a single output signal from a pair of input signals, the apparatus comprising:

a left phase adjuster operatively coupled to a left input to an audio enhancement system to produce left phase adjusted information;

a left enhancer that enhances the left input to produce left enhanced information, the left enhancer comprising a first perspective filter operative to enhance spatial characteristics of the left input;

a right enhancer operatively coupled to a right input to an audio enhancement system to produce right enhanced information, the right enhancer comprising a second perspective filter operative to enhance spatial characteristics of the right input;

a right phase adjuster that adjusts the phase of the right input to produce right phase adjusted information;

an inverter to invert the right enhanced information to produce right inverted enhanced information; and a mixer that combines at least a portion of the left phase adjusted information, at least a portion of the right phase adjusted information, at least a portion of the left enhanced information, and at least a portion of the inverted right enhanced information to generate an enhanced monophonic output, wherein the left and right phase adjusters preserve audio information during said combining by the mixer.

11. The apparatus of claim 10 wherein the left enhancer comprises a first gain control device and the right enhancer comprises a second gain control device.

12. The apparatus of claim 10 wherein the left enhancer comprises a first gain control device and the right enhancer comprises a second phase adjuster and a second gain control device.

13. The apparatus of claim 12 wherein the left and right phase adjusters modify a frequency response at frequencies where the frequency responses of the audio enhancement apparatus have approximately equal amplitudes and opposite phases so as to preserve audio information at the frequencies.

14. The apparatus of claim 10 further comprising a speaker wherein parameters of the left and right enhancers are dependent on speaker characteristics of the speaker.

15. The apparatus of claim 10 wherein the left enhancer comprises a first filter and a first gain control device and the right enhancer comprises a second filter and a second gain control device.

16. The apparatus of claim 10 further comprising a digital signal processor wherein the digital signal processor implements the left phase adjuster the left enhancer, and the mixer.

17. The apparatus of claim 10 further comprising a monophonic input and a stereo synthesizer wherein the stereo synthesizer synthesizes the first input and the second input from the monophonic input.

18. The apparatus of claim 17 wherein the stereo synthesizer comprises a delay.

* * * * *